(12) United States Patent  
Kimbrough, Jr.

(10) Patent No.: US 7,259,691 B2
(45) Date of Patent: Aug. 21, 2007

(54) WEARABLE, ATTACHABLE, OR HAND-HELD, SUPER-BRIGHT, LED-BASED, TEXTUAL, SAFETY ALERT SIGN AND PORTABLE EMERGENCY/WORK LIGHT

(76) Inventor: James Julian Kimbrough, Jr., 400 Pond St., Boston, MA (US) 02130

( * ) Notice: Subject to any disclaimer, the term of this patent is extended or adjusted under 35 U.S.C. 154(b) by 112 days.

(21) Appl. No.: 10/993,333

(22) Filed: Nov. 19, 2004

(65) Prior Publication Data

US 2005/0104741 A1 May 19, 2005

Related U.S. Application Data

(60) Provisional application No. 60/523,280, filed on Nov. 19, 2003.

(51) Int. Cl.
*G08G 1/095* (2006.01)
(52) U.S. Cl. ............. 340/907; 340/332; 340/573.1; 340/815.49; 340/908; 2/69; 362/13; 362/108
(58) Field of Classification Search ........... 340/907, 340/573.1, 432, 321, 329, 815.4, 815.49, 340/908, 326, 332; 362/103, 108; 2/69; 345/685
See application file for complete search history.

(56) References Cited

U.S. PATENT DOCUMENTS

| | | | |
|---|---|---|---|
| 4,523,258 A | 6/1985 | Morse et al. | |
| 4,602,191 A * | 7/1986 | Davila | 315/76 |
| 4,709,307 A * | 11/1987 | Branom | 362/103 |
| 4,733,486 A | 3/1988 | Gawell | |
| 4,929,936 A | 5/1990 | Friedman et al. | |
| 5,162,696 A | 11/1992 | Goodrich | |
| 5,245,516 A | 9/1993 | de Haas et al. | |
| 5,249,382 A | 10/1993 | Moynihan | |
| 5,309,656 A | 5/1994 | Montgomery | |
| 5,381,318 A | 1/1995 | Fang | |
| 5,434,759 A | 7/1995 | Endo et al. | |
| 5,469,342 A | 11/1995 | Chien | |
| 5,475,574 A | 12/1995 | Chien | |
| D373,387 S | 9/1996 | Wu | |
| 5,632,549 A | 5/1997 | Fang | |
| 5,690,411 A * | 11/1997 | Jackman | 362/103 |
| 5,870,110 A | 2/1999 | Mallory | |
| 5,871,269 A | 2/1999 | Chien | |
| 5,973,607 A | 10/1999 | Munyon | |
| 5,990,802 A | 11/1999 | Maskeny | |
| 6,201,525 B1 * | 3/2001 | Janney | 345/685 |
| D457,457 S | 5/2002 | Povey et al. | |
| 6,461,015 B1 * | 10/2002 | Welch | 362/103 |
| 6,511,198 B1 | 1/2003 | Erickson | |
| 6,515,583 B1 | 2/2003 | Lamparter et al. | |
| 6,549,121 B2 | 4/2003 | Povey et al. | |
| 6,709,142 B2 * | 3/2004 | Gyori | 362/554 |
| 6,834,395 B2 * | 12/2004 | Fuentes | 2/69 |
| 6,991,343 B2 * | 1/2006 | Langley et al. | 362/108 |

* cited by examiner

*Primary Examiner*—Davetta W. Goins
(74) *Attorney, Agent, or Firm*—Pandiscio & Pandiscio

(57) ABSTRACT

Accordingly, a primary object of the present invention is to provide a novel safety alert sign which provides a uniquely attention-getting and highly visible warning to oncoming drivers during both daylight, and, particularly twilight and dusk through the nighttime hours.

45 Claims, 35 Drawing Sheets

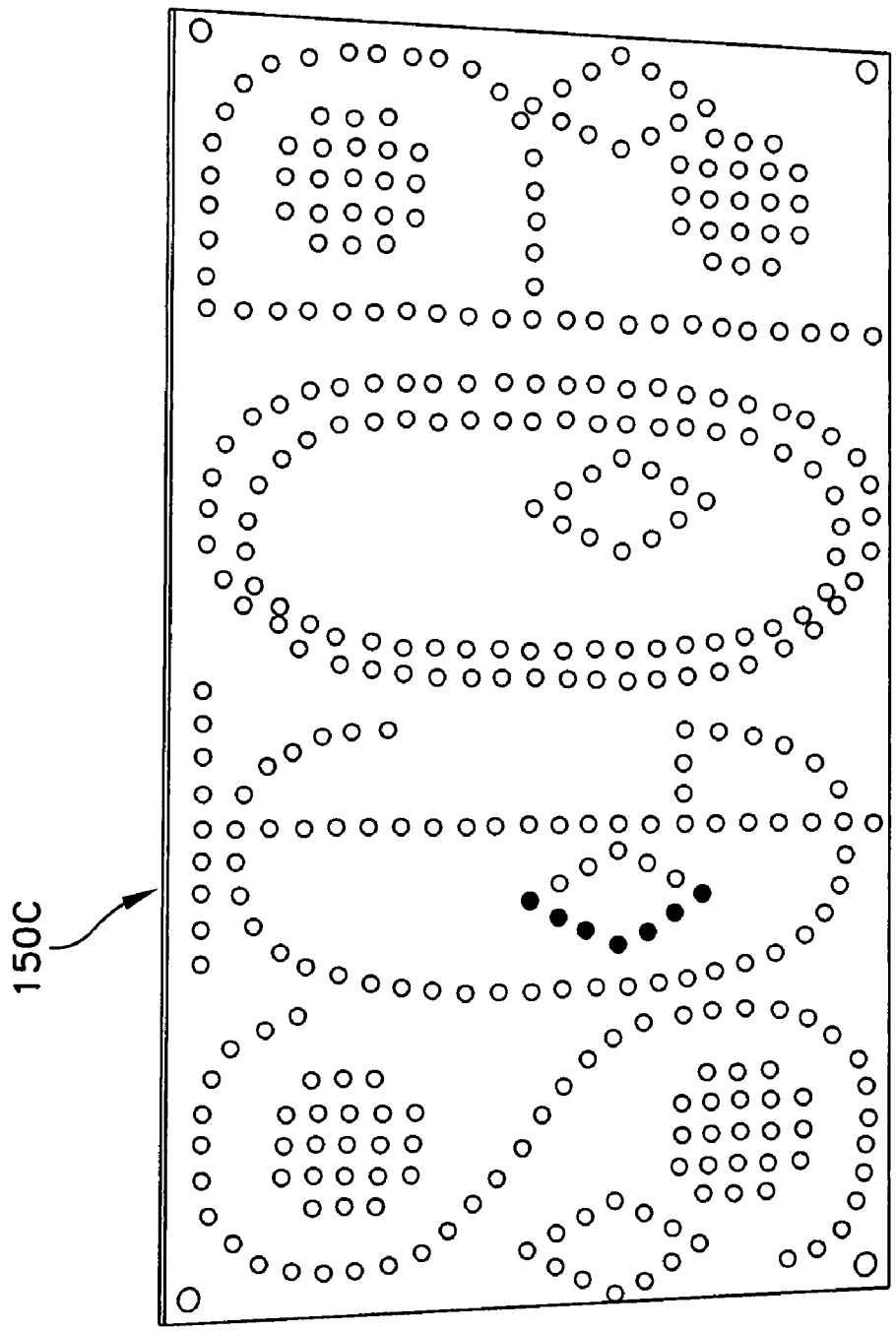

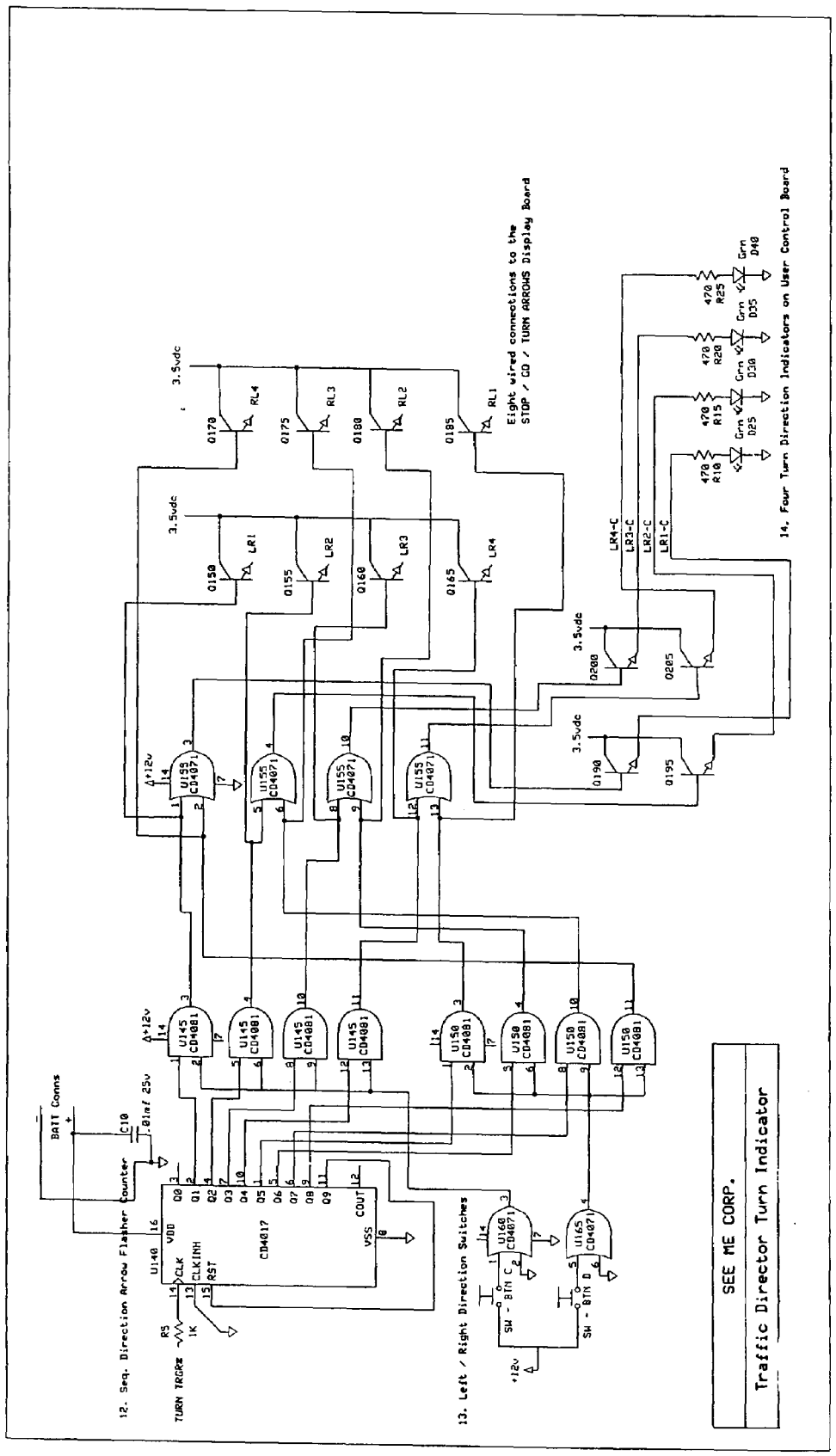

WEARABLE, ATTACHABLE, OR HAND-HELD, SUPER-BRIGHT, LED-BASED, TEXTUAL, SAFETY ALERT SIGN AND PORTABLE EMERGENCY/WORK LIGHT

REFERENCE TO PENDING PRIOR PATENT APPLICATION

This patent application claims benefit of pending prior U.S. Provisional Patent Application Ser. No. 60/523,280, filed Nov. 19, 2003 by James Julian Kimbrough, Jr. for WEARABLE, ATTACHABLE, OR HAND-HELD, SUPER-BRIGHT, LED-BASED, TEXTUAL, SAFETY ALERT SIGN, which patent application is hereby incorporated herein by reference.

FIELD OF THE INVENTION

This invention relates to safety alert apparatus and methods in general, and more particularly to apparatus and methods for generating a safety alert message.

BACKGROUND OF THE INVENTION

Nearly everywhere an individual travels on roads and highways, there is routine sharing of the pavement for multiple purposes. On most roadways, cars and trucks share space with cyclists, runners, and walkers. In other locations, there are pedestrian, child stroller, wheelchair, ATV and snowmobile crossings. Often unanticipated circumstances are encountered, such as unsafe roadways, bad weather, traffic congestion, accidents, road repairs, delivery trucks that block traffic, vehicle breakdowns, stressed-out commuters, and congestion arising from bottlenecks occurring before and after large public events. All of these conditions amplify the need to be seen for those sharing the road with motorists.

Drivers face a growing number of distractions ranging from radios, and onboard audio and video devices, to the nearly ubiquitous and now well-documented, highly distracting cell phone. Given the power, mass, and velocity of modern vehicles, together with the period of time a driver requires for recognition and reaction, it can be life threatening when a cyclist or pedestrian is not noticed until the last instant. This type of situation is especially hazardous at dusk or after dark. Those who are not in automobiles, but need to share the roadside, face a growing level of danger. The threat is to both young and old alike. Such individuals have a life-saving need to make themselves seen at the greatest possible distance by approaching drivers.

Each year in the U.S., hundreds of people are killed as a result of cycling accidents. A much larger number are injured, either temporarily or permanently. An even larger population of victims exists among pedestrians. In a recent annual compilation by the State of New York, bicyclists and pedestrians together experienced 30,000 injuries and 500 fatalities. The injury numbers were represented as low, due to flaws in current accident reporting requirements. The study stated that of the major factors contributing to such accidents, chief among them are: (1) confusion on the part of a cyclist or pedestrian unable to make needed judgments, to react quickly, or take fast evasive action (often due to age or inexperience); (2) driver inattention; and (3) a driver failing to yield the right-of-way. Driver error was present in over one-third of all reported accidents.

The report stated that, "Collectively, human error is probably the most significant factor." The carnage in other leading states, California, Florida, and Texas, is as bad or worse.

The Insurance Institute for Highway Safety reported that in the year 2002, 660 U.S. bicyclists were killed in crashes with motor vehicles. These deaths are more frequent in the warmer months, on the busier traffic days of the week (Monday and Friday), in urban population areas, and during periods of darkness.

Motorists often share the roadside with countless cyclists, walkers, and runners. Many drivers often encounter a cyclist, walker, or jogger in dark clothing, with either no illumination or poor illumination. Accident statistics clearly indicate that the trust of these individuals in approaching motorists is misplaced. This type of hazard has become increasingly true in a society in which driving while holding a distracting phone conversation has become so common and problematic. Dialing motorists have now become their own statistical risk category, as a documented threat to others and to themselves.

Particularly during periods of darkness, improved visibility affords two distinct advantages. A cyclist or pedestrian gains an additional margin of safety. A motorist gains an additional margin of response. Each benefits from a simple but life-saving collaboration between the cyclist or pedestrian who needs to be seen, and the motorist who cannot respond until they have seen the cyclist or pedestrian. Each benefits from the motorist recognizing and responding to the presence of the cyclist or pedestrian as early as possible.

Research at the University of Michigan, funded by NHTSA, examined numerous formats and types of content used for display in road hazard and warning signs. Subjects noted a preference for signs that quickly conveyed a message in brief, meaningful text. Subjects preferred this type of message to lines, arrows, drawn hazards, and other signage in which cognitive interpretation is required to deduce an implied meaning. This is especially significant inasmuch as safe response distances rapidly close at highway speeds. This extends also to simple steady or blinking lights, which in some instances might be so small or weak as to not provide an effective, attention getting warning at all.

DEFICIENCIES OF THE PRIOR ART

Several methods have been employed in the past to help make an individual more visible at the roadside. This includes the nighttime use of passive reflectors and reflective strips. However, such reflectors are ineffective without a proper source and angle of illumination.

Active devices have been made for attachment to a bicycle frame which use electroluminescent strips. These active devices consume significant amounts of power and provide relatively low light output. Such devices are typically slightly visible at night, and impractical to use during daylight hours.

Small LED blinkers have been made that attach to a bicycle seat or a rider's backpack or waist belt. These LED blinkers typically perform like a taillight for the bike. The blinkers are of varying intensity. Such LED blinkers are uniformly very small in size, and have far less attention-getting impact than the present invention.

SUMMARY OF THE INVENTION

Accordingly, a primary object of the present invention is to provide a novel safety alert sign 5 which provides a uniquely attention-getting and highly visible warning to oncoming drivers during both daylight, and, particularly dusk through nighttime hours.

In one form of the invention, there is provided a safety alert sign for providing a visible warning, the safety alert sign comprising:

a display board having a first set of LEDs supported thereon and a second set of LEDs supported thereon, wherein the first set of LEDs are disposed on the display board in a first given pattern, the second set of LEDs are disposed on the display board in a second given pattern, the first given pattern forms a textual message, and the second given pattern forms a floodlight;

a control system in electrical connection with the first set of LEDs and the second set of LEDs, an actuator in electrical connection with the control system for selectively operating the first set of LEDs and the second set of LEDs; and a first voltage source and a second voltage source, the first voltage source in electrical connection with the first set of LEDs and the second set of LEDs as actuated by the control system, and the second voltage source in electrical connection with the control system.

In another form of the invention, there is provided a hand-held device for directing traffic, the hand-held device comprising:

a display board having a front side and a back side, a left side and right side, a topside and a bottom side, a first set of LEDs supported on the display board and a second set of LEDs supported on the display board, the first set of LEDs and the second set of LEDs disposed for viewing from the front side of the display board, wherein the first set of LEDs are disposed on the display board in a first given pattern, the second set of LEDs are disposed on the display board in a second given pattern, the first given pattern forms a message to stop traffic, and the second given pattern forms a message to advance traffic;

a control system in electrical connection with the first set of LEDs and the second set of LEDs, and the control system in attachment to the display board;

a control handle in attachment with the display board, and the control handle in electrical connection with the control system; and a voltage source in electrical connection with the first set of LEDs, the second set of LEDs, and the control system.

In another form of the invention, there is provided a hand-held device for directing traffic, the hand-held device comprising:

a display board having a front side and a back side, a left side and right side, a topside and a bottom side, a first set of LEDs supported on the display board and a second set of LEDs supported on the display board, the first set of LEDs and the second set of LEDs disposed for viewing from the front side of the display board, wherein the first set of LEDs are disposed on the display board in a first given pattern, the second set of LEDs are disposed on the display board in a second given pattern, the first given pattern configured for forming a message to stop traffic, and the second given pattern configured for forming a message to advance traffic;

a control system in electrical connection with the first set of LEDs and the second set of LEDs, and the control system in attachment to the display board;

a control handle in attachment with the display board, and the control handle in electrical connection with the control system;

a voltage source in electrical connection with the first set of LEDs, the second set of LEDs, and the control system;

wherein the first given pattern formed by the first set of LEDs comprises a first textual message;

wherein the first textual message comprises STOP;

wherein the first set of LEDs comprises red LEDs;

wherein the second given pattern formed by the second set of LEDs comprises a second textual message;

wherein the second textual message comprises GO;

wherein the second set of LEDs comprises green LEDs;

a third set of LEDs supported on the display board for viewing from the front side thereof, the third set of LEDs disposed in a third given pattern, and the third given pattern forms a first group of LEDs to signal a right turn and a second group of LEDs to signal a left turn;

wherein the first group of LEDs comprises a first plurality of arrows configured to scan in a direction from the left side to the right side of the display board;

wherein the second group of LEDs comprises a second plurality of arrows configured to scan in a direction from the right side to the left side of the display board;

wherein the third set of LEDs comprises green LEDs;

a fourth set of LEDs supported on the display board for viewing from the front side thereof, and the fourth set of LEDs configured to form a floodlight for selective illumination in a direction from the back side to the front side of the display board;

a fifth set of LEDs disposed behind and away from the back side of the display board, and the fifth set of LEDs configured to form a spotlight for selective illumination of an operator holding the control handle;

a sixth set of LEDs disposed behind and in a direction away from the back side of the display board, wherein the fifth set of LEDs are configured to illuminate the front side of a right-handed operator and the sixth set of LEDs are configured to illuminate the front side of a left-handed operator;

a seventh set of LEDs in attachment to the control handle and disposed in a direction away from the bottom side of the display board so as to form a spotlight for selectively illuminating a ground surface adjacent to an operator;

an eighth set of LEDs supported on the display board for viewing from the back side thereof, and the eighth set of LEDs forming indicator lights for conveying to an operator display information communicated on the front side of the display board;

wherein the control handle comprises a joystick grip having an index finger switch and a plurality of thumb operable buttons;

wherein the voltage source comprises an attached battery.

In another form of the invention, there is provided a safety alert sign for providing a visible warning, the safety alert sign comprising:

a display board having a first set of LEDs supported thereon and a second set of LEDs supported thereon, wherein the first set of LEDs are disposed on the display board in a first given pattern, the second set of LEDs are disposed on the display board in a second given pattern, the first given pattern forms a textual message, and the second given pattern forms a floodlight;

a control system in electrical connection with the first set of LEDs and the second set of LEDs, an actuator in electrical connection with the control system for selectively operating the first set of LEDs and the second set of LEDs; and a voltage source in electrical connection with the first set of LEDs, the second set of LEDs, and the second voltage source.

In another form of the invention, there is provided a safety alert sign for providing a visible warning, the safety alert sign comprising:

a display board having LEDs supported thereon, wherein the LEDs are disposed on the display board in a given pattern, and the given pattern forms a textual message;

a control system in electrical connection with the LEDs, an actuator in electrical connection with the control system for selectively operating the LEDs; and a first voltage source and a second voltage source, the first voltage source in electrical connection with the LEDs, and the second voltage source in electrical connection with the control system.

The above and other features of the present invention, including various novel details of construction and combinations of parts and method steps, will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 27A and 27B are preferred circuit diagrams for the novel traffic director device shown in FIGS. 10-26.

DETAILED DESCRIPTION OF THE PREFERRED EMBODIMENTS

The union of a new class of high-intensity LEDs and recent developments in high energy storage density battery technology yields a flashing, textual sign, configured to piercingly interrupt the distraction of a driver, even a cell phone user. This is the basis of the present invention. The message is sharp, highly visible, attention getting, and personal: "Caution! There is a person attached to this!"

Figure 1:
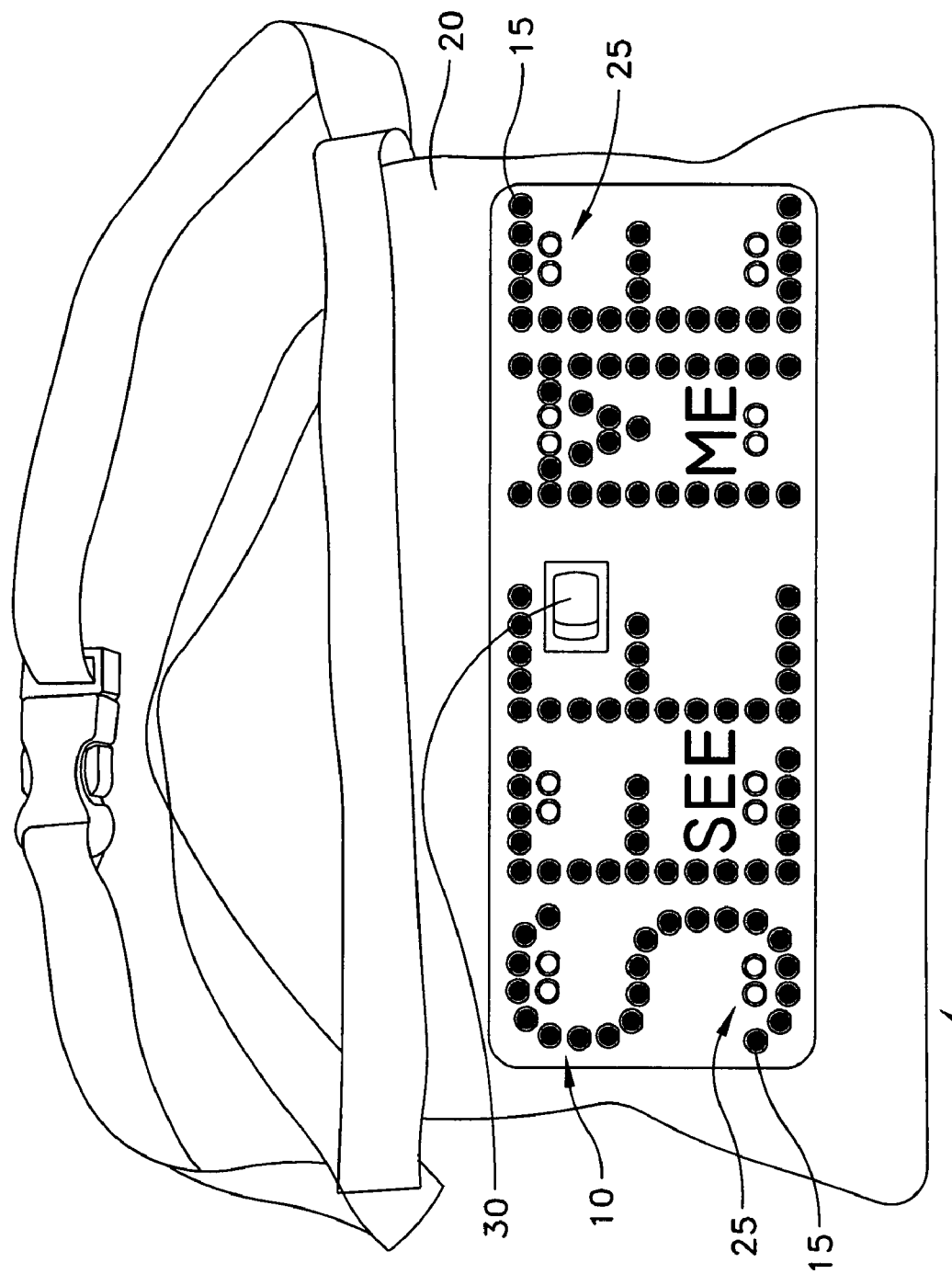
FIGS. 1-8 show a novel safety alert sign formed in accordance with the present invention.

Referring to FIG. 1, in a preferred embodiment of the present invention, there is shown a safety alert sign 5 which provides a uniquely attention-getting and highly visible warning to oncoming drivers during both daylight and, particularly, dusk through nighttime hours. Alert sign 5 quickly and clearly indicates that a person is sharing the road in a manner to preserve the person's safety and that of an approaching driver.

Safety alert sign 5 flashes a text-based message 10 using newly developed, super-bright LEDs 15 that are highly visible both day and night, and offer a broader cone of visibility than previous generations of devices. Further, this new generation of high-brightness LEDs operates at a low voltage and uses significantly less electrical current than any previous devices, including those that were far less bright. Complimenting this technology is the growing retail availability of new NiMH battery technologies delivering very high energy-storage density. With a quick recharge capability, and no charge memory limitations as in older NiCd batteries, this combination now makes practical a portable safety alert sign 5 with a convenient battery life.

The large, bright flashing text message 10 offers an advantage for the individual who wants their person or their conveyance to be noticed. This is in sharp contrast to a simple blinking light that can have an ambiguous meaning, and in numerous applications does not send any message to a driver other than, "This is a blinking light". The large and bright flashing text message 10 of safety alert sign 5 sends a clear message, "Caution! There is a person attached to this."

In the previously discussed research performed at the University of Michigan Transportation Research Institute, Human Factors Division, of all the types of symbols presented in numerous types of motorist warning signs, text was the cue preferred by drivers to indicate the location of a hazard, and text led to the highest recognition. In the SEE ME safety alert sign 5 shown in FIG. 1, the use of text facilitates the safety of people who need to be seen by oncoming drivers. Particularly during twilight or darkness, safety alert sign 5 enables a user to be responded to with the least amount of time required for recognition and reaction. Less mental interpretation is required so as to enable a faster reaction time. This is generally applicable to even the cell phone-distracted driver who may be caught up in an emotional conversation consuming his or her attention.

Reading involves a succession of eye fixations across a line of text. This invention recognizes the convention in written language (in this case English), of proceeding from left to right within a sentence. This invention compliments that process by both displaying the warning text (in this case left to right), sequentially, one word at a time, to help capture and hold attention, and then repeating the full expression to emphasize and reinforce it, once in each display cycle. In support of the Michigan findings, researchers at Texas A&M University have reported that language concreteness, and its capacity to evoke mental images, has been shown to be one of the most powerful determiners of comprehension. In this invention, "SEE ME" is a concrete expression, as compared with an ambiguous blinking light that could mean anything, or even nothing. This invention takes advantage of the silent voicing that is a part of reading. The displayed text enables the viewer to quickly make and use an association. The next time the viewer sees a "SEE ME" sign, they will have prior knowledge, recognizing what this means to them, and speeding preparation for the task ahead, that of avoiding a person who is sharing the roadway.

The configuration of safety alert sign 5 enables straightforward manufacturing of units configured for specific applications in numerous languages.

In a preferred embodiment of the present invention, safety alert sign 5 is designed to be worn around the waist, a camel-pack, a backpack, or the neck of a cyclist or a walker. In other preferred embodiments of the present invention, safety alert sign 5 is attached to the rear or side of a stroller, wheelchair, or ATV. Safety alert sign 5 preferably comprises the warning "SEE ME" as a text based message 10, spelled out in high-brightness yellow LEDs 15.

The "SEE ME" warning message 10 is visible under clear nighttime conditions at a great distance. It is easily visible at a distance of hundreds of feet, and the text is readable for normal distant vision at in excess of 100 feet. Within 200-300 feet, it is stunningly eye-catching. At this range, whether looking in the general direction, or when peripheral vision is stimulated by the flashing effect, it is difficult to miss the text-based message 10.

Preferably, safety alert sign 5 is configured to display a distinctive flash pattern of the word "SEE", then the word "ME", followed by the words "SEE ME", with a full cycle of flashes occurring in just over one second. The cycle is then repeated continuously, for as long as safety alert sign 5 is powered on. For the safety of individuals of all ages, it is expected that the blinking text pattern 10 of safety alert sign 5 will become widely recognized as a personal safety device requiring little cognitive effort to understand that a person lies ahead.

Safety alert sign 5 preferably attaches to the wearer's waist (or backpack) by a web belt that comfortably fits as snugly as the wearer chooses.

Safety alert sign 5 is preferably housed in a flexible, transparent, waterproof pouch 20 that the user can open to change batteries at any time. Pouch 20 protects safety alert sign 5 from any rain, snow, or roadside spray or splashing. Pouch 20 is preferably flexible, and both flashing text message 10 and a built-in set of work lights 25 (FIGS. 1 and 2) can be turned on or off by pressing a front-panel rocker switch 30 through the pouch material, without opening pouch 20.

Looking at FIG. 1, in a preferred embodiment of the present invention, there is shown pouch 20 configured as waterproof packaging for a user to wear around the waist for rearward visibility.

Figure 2:
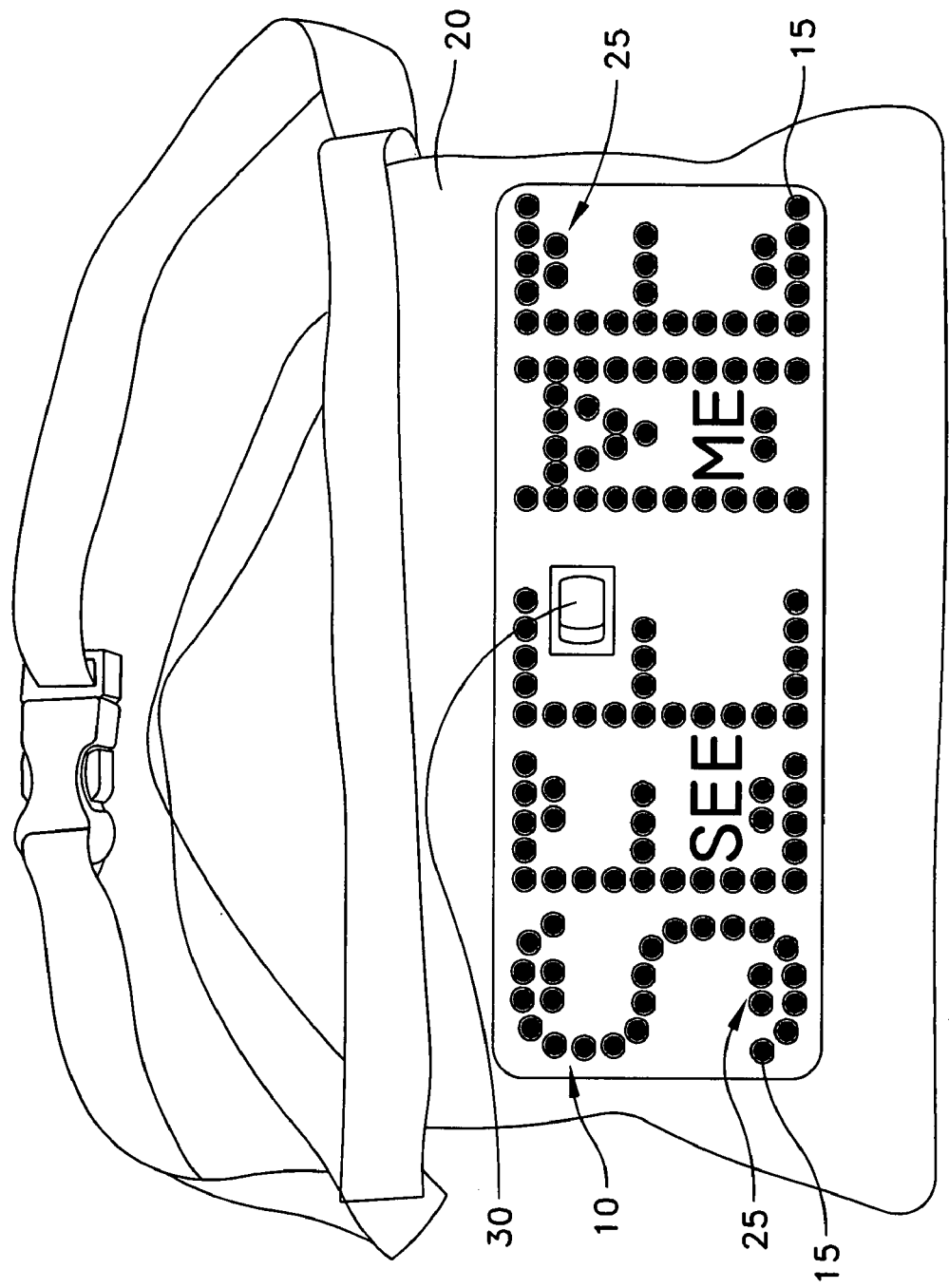

Looking at FIG. 2, in a preferred embodiment of the present invention, there is shown waterproof packaging for a user to wear around the waist or neck for forward visibility and for forward illumination (provided by work lights 25) when in need of a high-luminosity source for a safer view, or to make emergency repairs in a bright field of light.

Figure 3:
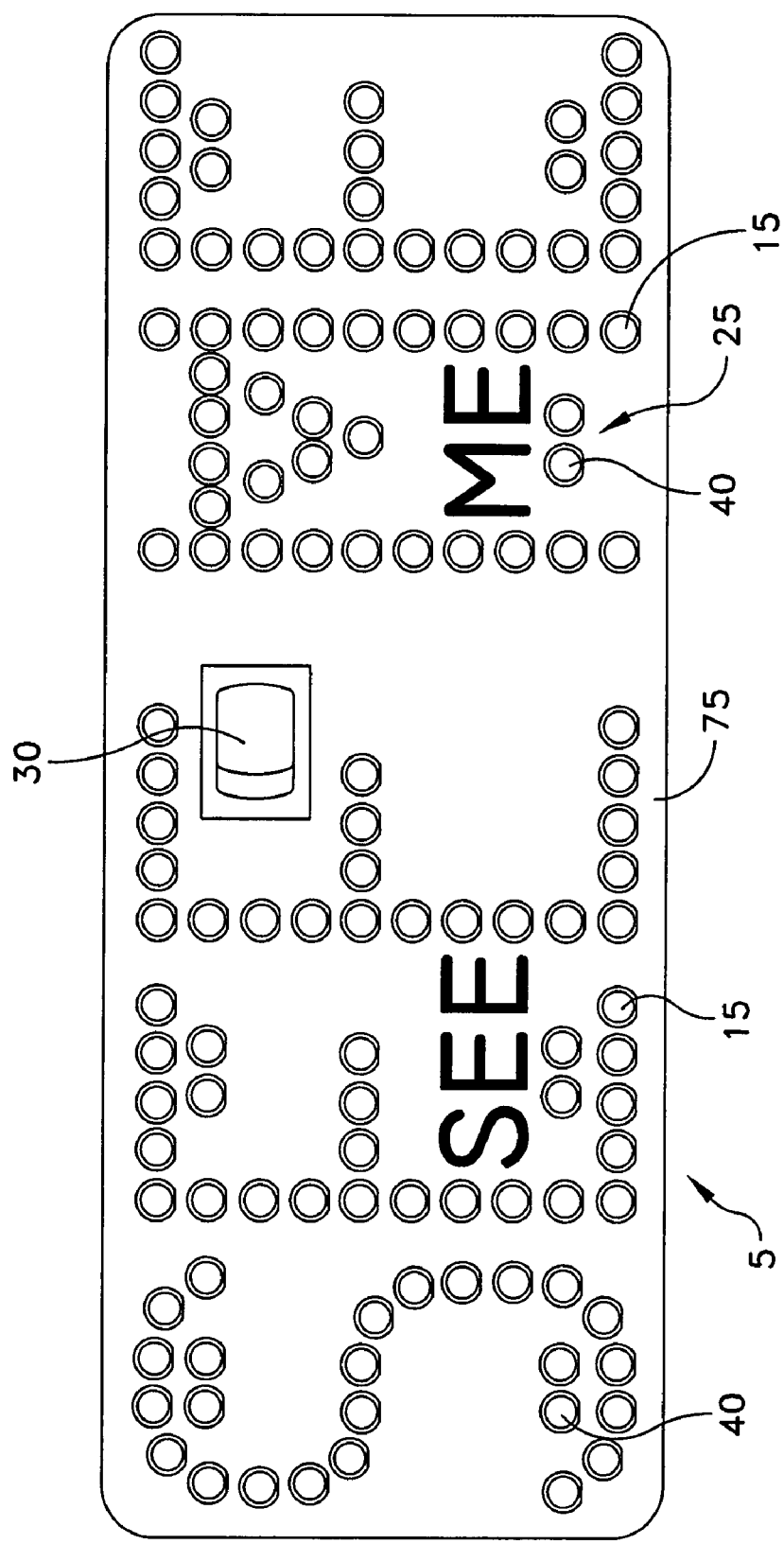

Looking next at FIG. 3, in a preferred embodiment of the present invention, there is shown a front view of safety alert sign 5 without pouch 20.

Safety alert sign 5 is preferably designed to have a work light mode of operation. By clicking the on-off rocker switch 30 to the left, safety alert sign 5 continuously illuminates white LEDs 40 of the set of work lights 25 for use as a wide-angle, high-brightness emergency, work, or reading light.

The work light mode also preferably illuminates both words of text based message 10 continuously, in the manner shown in FIG. 2. Given the intense yellow frequency of the LED light source 15, a rider can wear the device around their neck, facing forward, using both text LEDs 15 and work light LEDs 40, to see more clearly in conditions of, for example, heavy fog. As the work light mode also uses the set of very high-intensity white LEDs 40, a user reading instructions at night will not miss important warnings that might be in yellow print, which would disappear under pure yellow light.

Work lights 25 enable a user in need of light to take the fullest possible advantage of this very bright light source. For example, a cyclist who needs to pull off the road to change a tire tube, repair a drive chain, help an injured companion, read a map, or inspect a possible tent site, will find that with safety alert sign 5 worn around their neck, held in a hand, or positioned so as to face their work, an with text LEDs 15 and work light LEDs 40 on, a wide area is illuminated.

Figure 4:
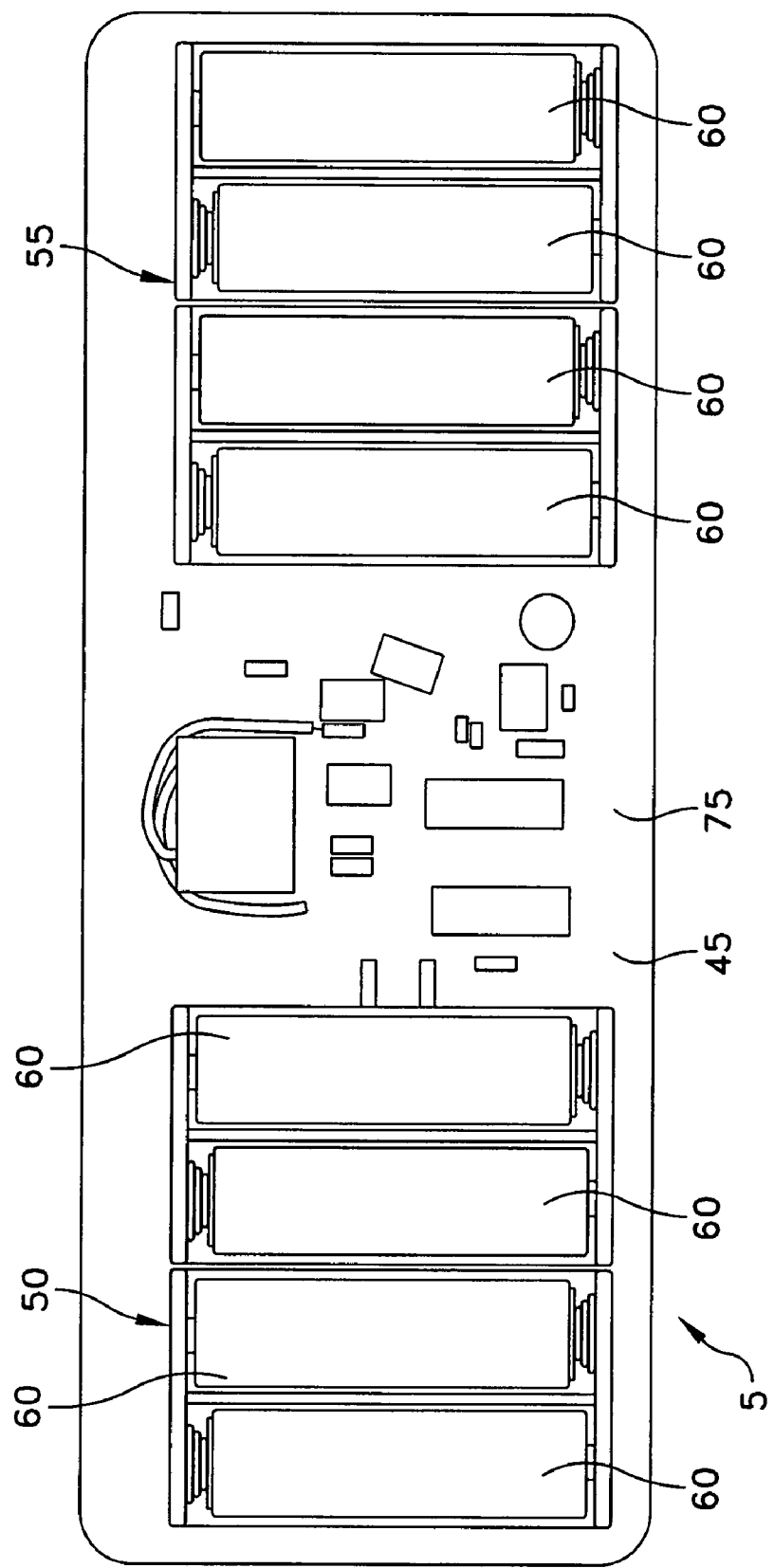

Looking at FIG. 4, there is shown a rear view 45 of safety alert sign 5.

Safety alert sign 5 is preferably powered by two sets 50, 55 of four rechargeable NiMH size AA batteries 60. These batteries 60 are presently available in numerous storage capacities, from 600 mAh up to 2300 mAh. Safety alert sign 5 uses rechargeable 2300 mAh NiMH batteries 60 that can be recharged at any level of discharge without a "memory effect". Estimates of duration of service quoted here are based upon these batteries being used from an initial state of "fully charged". For emergency use, other rechargeable, or disposable, AA battery replacements are available in any retailer that sells AA batteries. These retail batteries can plug in as direct replacements should a user find himself or herself in a setting where a charger cannot be plugged into an energy source.

Surveys among bicycle commuters suggest that the national average bicycle commute is less than one hour. Safety alert sign 5 is designed to provide a flashing, high-brightness warning for over five hours when powered by the supplied batteries 60 in a state of full charge.

Safety alert sign 5 is powered by two separate sets 50, 55 of four batteries 60. Sets 50, 55 each power different portions of the circuitry. More particularly, one battery set 50, 55 preferably powers text LEDs 15, and the other battery set 50, 55 preferably powers the control circuitry and work light LEDs 40. Safety alert sign 5 is specifically designed for use by individuals who might unavoidably find themselves in a nighttime situation that requires reserve lighting capacity. This might include situations where a "one-shot" device that just "goes dead" is itself a risk factor. Safety alert sign 5 is designed so both the warning sign 15 and the work light 25 have reserve capacity.

The "redundant energy design" capability of safety alert sign 5 means that after five hours of using text message 10 on the road, if yellow LEDs 15 appear to be growing dim, the user can swap the two sets 50, 55 of batteries 60, and then continue for another five hours of bright usage. In the work light mode, batteries 60 powering white LEDs 40 of work lights 25 can also be swapped after a few hours, or when the while LEDs 40 appear to be growing dim. This will enable an additional period of usage of work lights 25. The third reserve component is based upon the white LEDs 40 in work lights 25. White LEDs 25 continue to operate at lower voltages than yellow LEDs 15. After either set 50, 55 of the batteries 60 have been drained so as to have the yellow LEDs 15 fade out, either set 50, 55 of "nearly discharged" batteries 60 will enable the white LEDs 40 to continue to give some amount of usable light for an additional period of time.

Safety alert sign 5 is preferably supplied with an AC-to-DC/DC-to-DC charger. In normal use, batteries 60 should be topped off after about five hours of use. Leaving batteries 60 in safety alert sign 5, or in a charger between uses, will not harm batteries 60. Under normal use, without repeatedly draining the batteries completely, batteries 60 of safety alert sign 5 should serve well through up to 1000 charge cycles. Safety alert sign 5 is preferably supplied with a high-reliability "quick" charger that will quick charge the batteries from AC power, or an automobile cigarette lighter, typically in a matter of minutes. Preferably, safety alert sign 5 allows any compatible charger to be employed. If the compatible charger is of a lesser rating, the charging will simply take longer to complete.

Safety alert sign 5 is preferably configured to be opened by the user and removed from waterproof pouch 20 for replacement of batteries 60. Battery replacements are available from SEE ME CORP, and from numerous other commercial retail or web-based suppliers. As battery technology continues to advance, for example, with expected decreases in cost for new lithium batteries, the consumer is not in a proprietary grip, but rather free to shop for both price and improved energy storage capacity. Batteries 60 are preferably non-toxic as regards disposal considerations, but if the user wishes, 60 batteries can be discarded by finding one of many local recycling sites on RBRC.COM.

Battery holders 50, 55 used in safety alert sign 5 are designed to remove any battery from the circuit that a user might unintentionally install in reverse polarity. This helps protect the user from short-circuits that could result in sudden battery discharge, fire, or battery overheating or explosion. As with any battery-powered device, and as is clearly displayed on the device itself, users are cautioned to correctly observe battery polarity. Supplied batteries 60 are preferably rechargeable, and a charger is preferably supplied with the unit. Non-rechargeable AA batteries may be used in safety alert sign 5; however, only rechargeable batteries 60 should placed into a charging unit. Single-use, non-rechargeable batteries must never be placed into a battery charger.

Safety alert sign 5 employs rugged, state-of-the-art control electronics, designed for long life. In expected use, the high-brightness yellow LEDs 15 and white LEDs 40 are rated to serve the owner for many years.

Attaching safety alert sign 5 to a user is both simple and comfortable, and the weight goes unnoticed when attached to the back or a backpack. The total weight of safety alert sign 5 is preferably about one pound. This is much lighter than the weight of a NiMH Night Rider HID Storm handlebar-mounted headlight with a detached battery pack. The aforementioned Night Rider unit weighs more than a few pounds, and will only shine for as little as an hour and a half in its "brightest" mode.

Safety alert sign 5 is the only device of this nature. No other personal textual warning/safety devices are utilizing these technologies and found on the market.

See Me™ Limitations

The use of safety alert sign 5 will not help to protect a person's life under every hazardous circumstance. Use of safety alert sign 5 cannot protect a user from bodily injury. Even when actively using safety alert sign 5, circumstances can yield a life-threatening encounter with the operator of an automobile. Safety alert sign 5 is intended to help a cyclist or other user to mitigate the risk they face in sharing the roadside with motorists, particularly at dusk and during hours of darkness, and especially where the interests of safety are served by improved visibility.

Safety alert sign 5 can improve the routinely poor visibility of a cyclist or pedestrian, especially to mitigate the grave risk posed by the approach of vehicles from behind or the rear quadrants, and this includes, for example, instances involving wheelchair or baby carriage crossing. This is particularly important during hours of darkness. Improved visibility can be advantageous if an oncoming motorist is distracted or inattentive.

Safety alert sign 5 is not designed to awaken drivers who have fallen asleep. Safety alert sign 5 cannot make aggressive drivers yield any due right-of-way. Safety alert sign 5 does not make an intoxicated or drowsy driver suddenly more cautious or vigilant.

Figure 5:
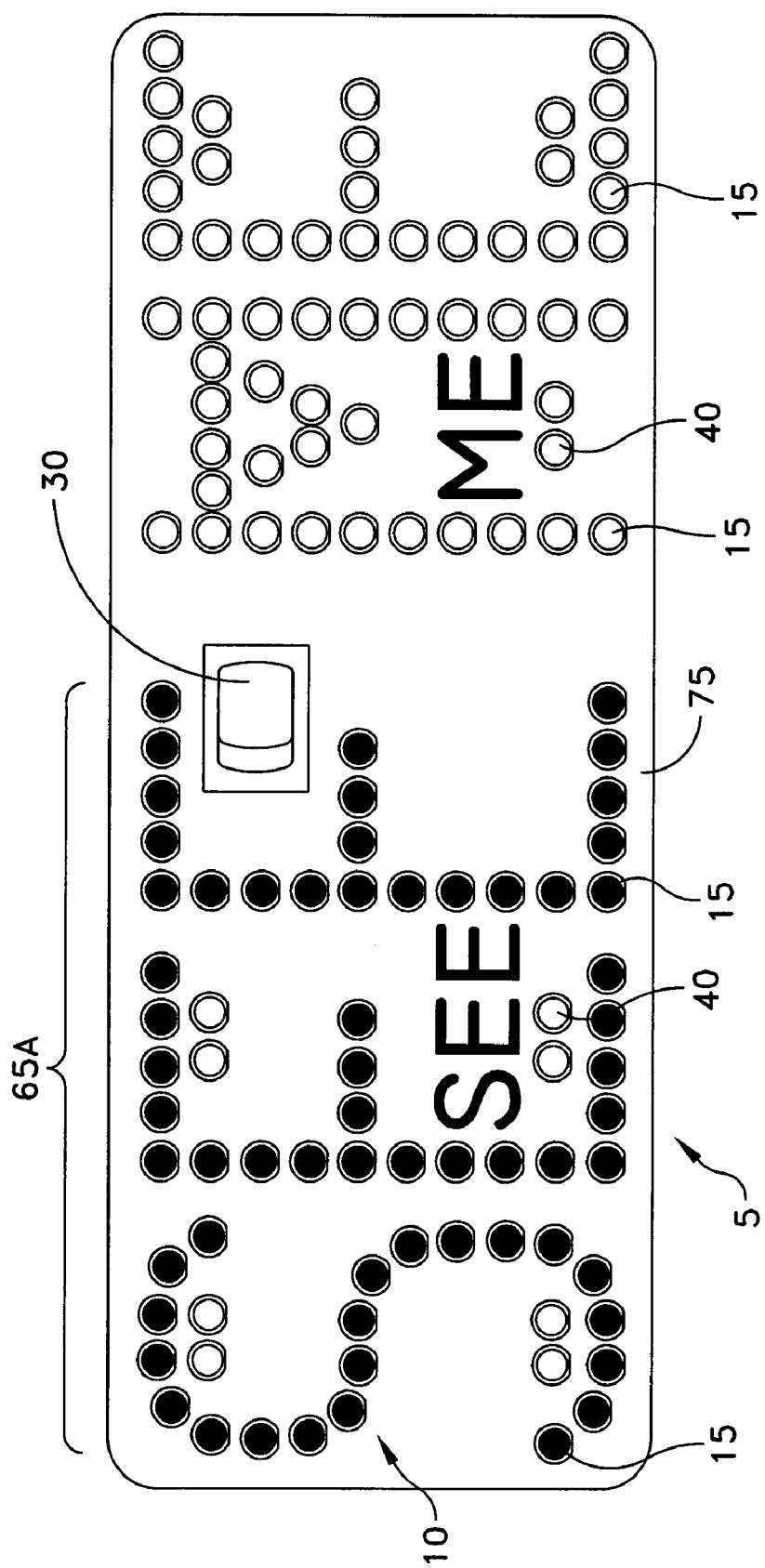
Figure 6:
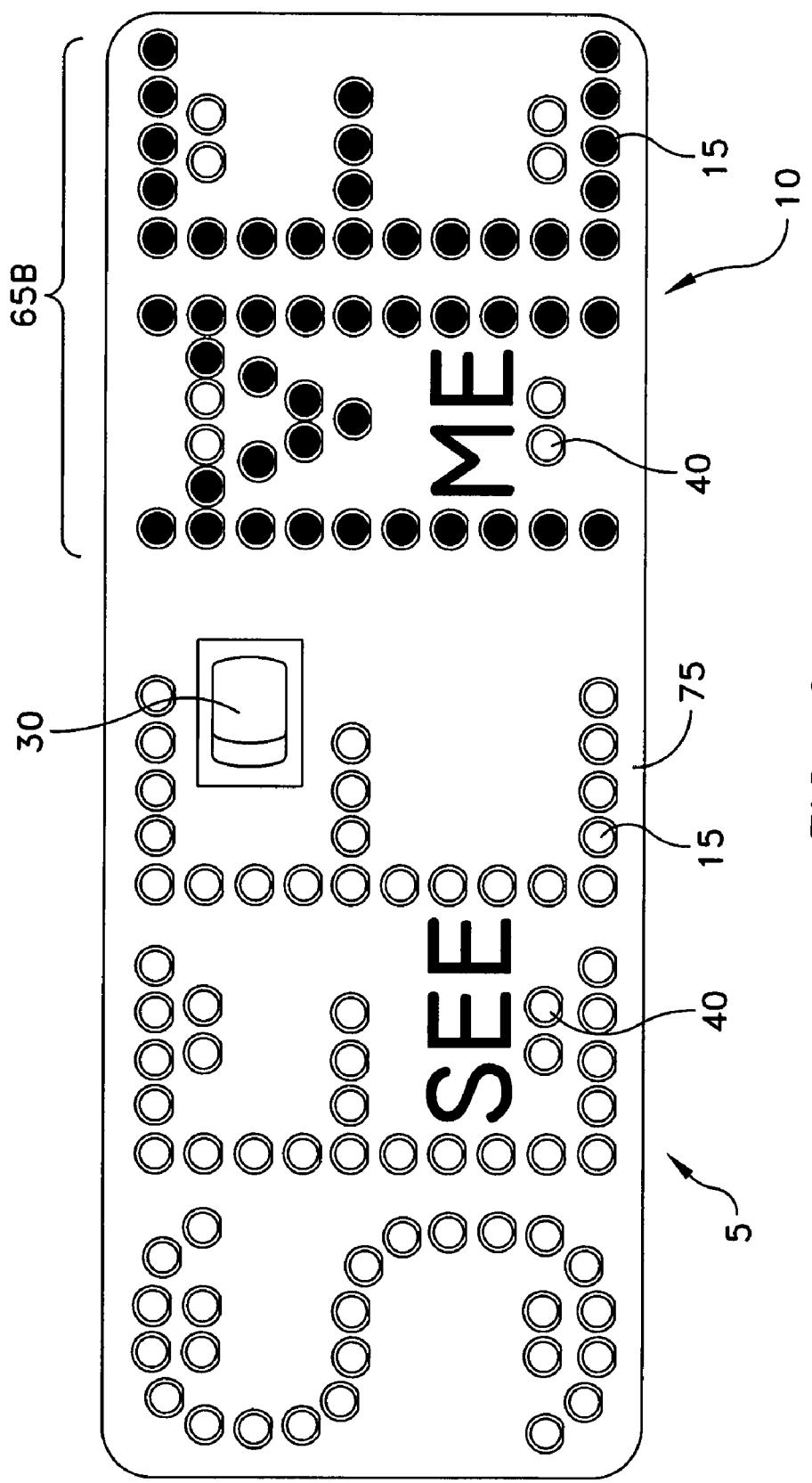
Figure 7:
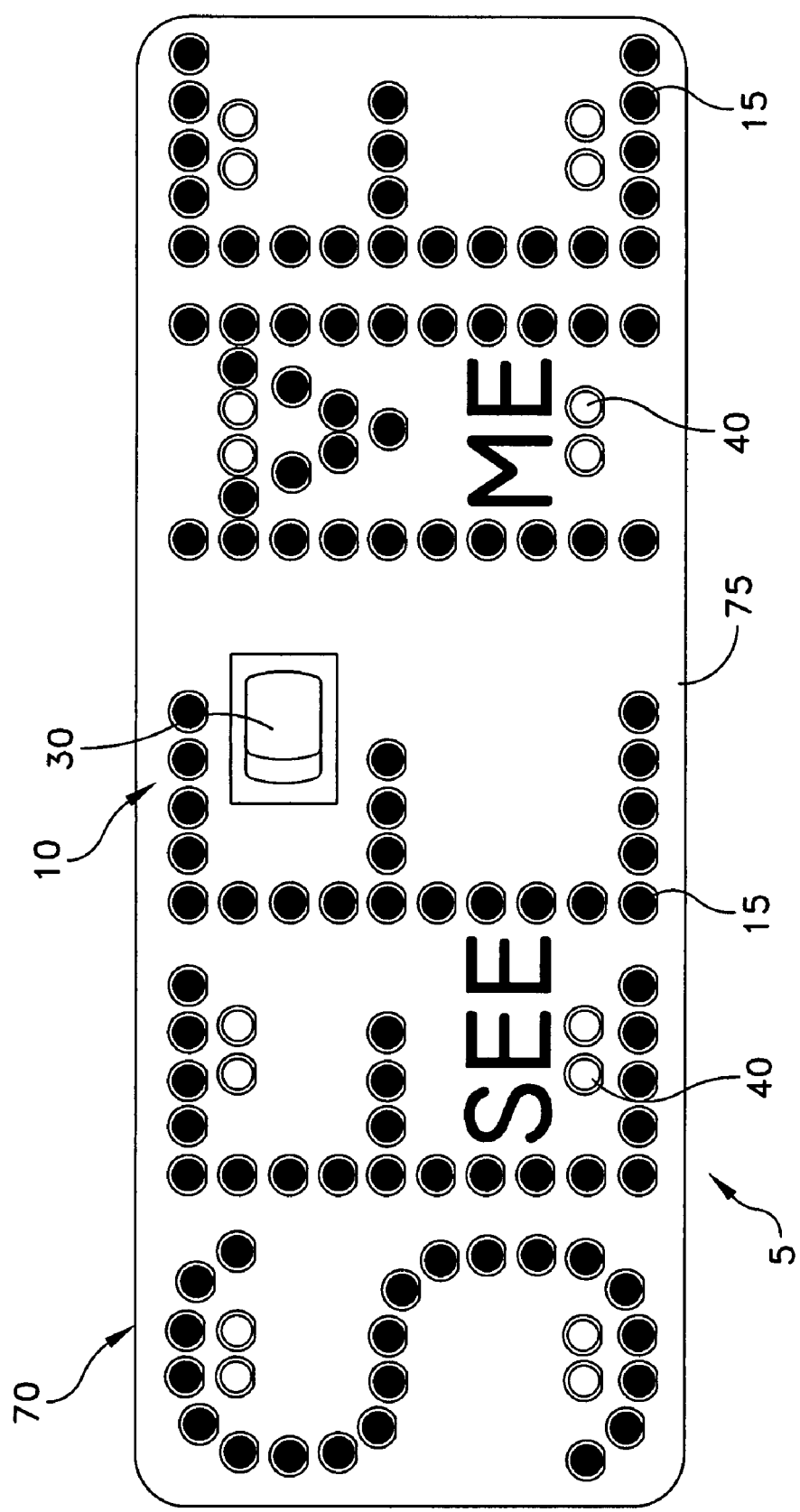

Referring next to FIGS. 5-7, in a preferred embodiment of the present invention, safety alert sign 5 repeatedly flashes, in succession, the word "SEE", then the word "ME", then the phrase "SEE ME", with the entire flash sequence occurring at approximately 1 Hertz, i.e., approximately one time per second. The visual appearance is as follows: first "SEE" 65A is flashed (FIG. 5), which is followed by "ME" 65B (FIG. 6), and which is then followed by both words "SEE ME" 70 (FIG. 7).

The cycle then repeats until the device is turned off.

Figure 8:
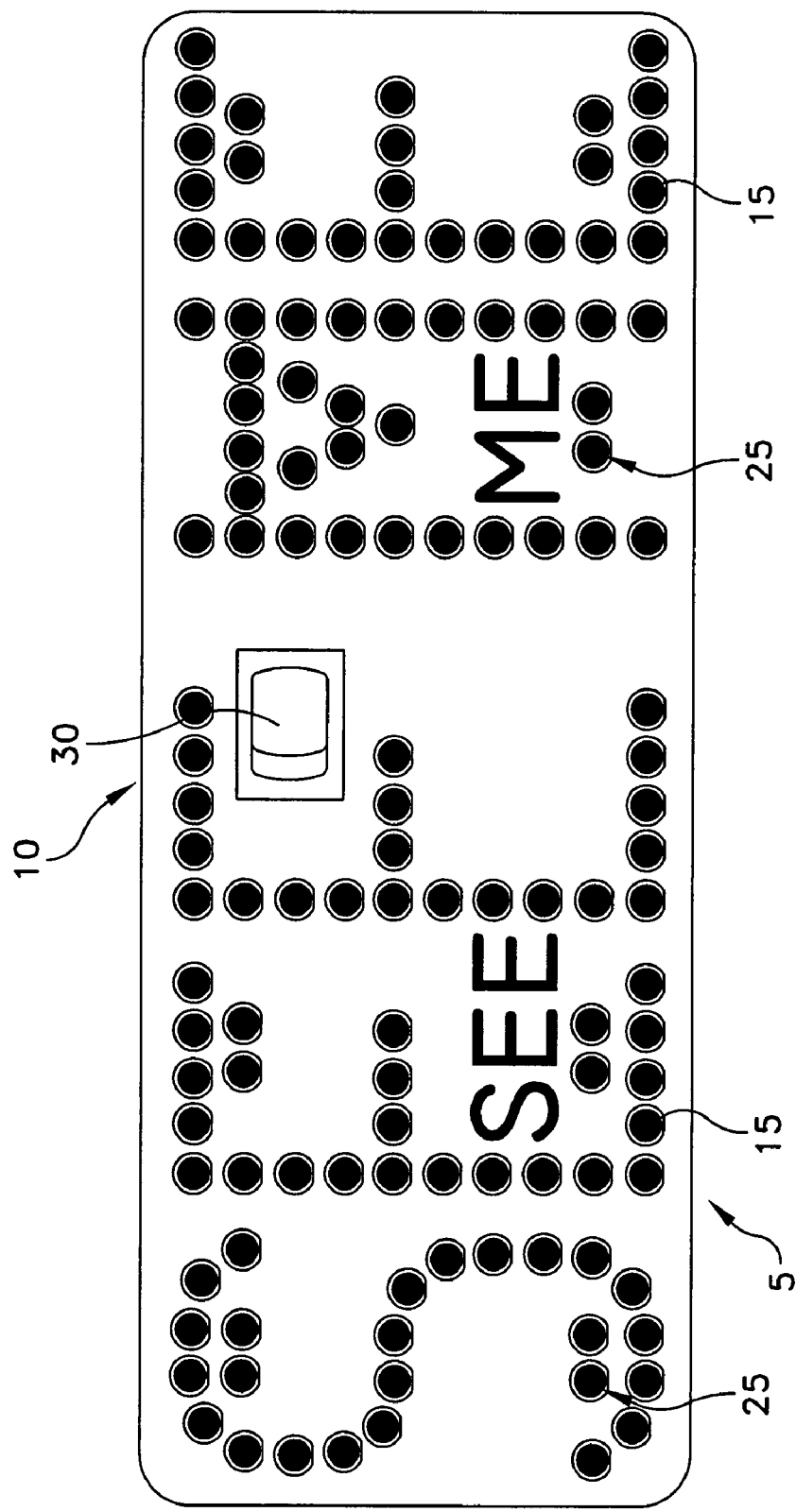

Referring now to FIG. 8, in a preferred embodiment of the present invention, there is shown a high-brightness, emergency/work illumination mode in which white LEDs 40 of work lights 25 and yellow LEDs 15 of text based message 10 are all illuminated.

Note that these photos were made under bright lighting conditions, and safety alert sign 5 is extremely visible and attention getting at a great distance, even before words 65A, 65B, 70 can be read clearly. This is true both in daylight, and especially during twilight or dusk, and the dark of night.

This sequential display of words 65A, 65B, 70 is specifically used to emphasize the message conveyed by the words. For example, a cyclist wants a driver to "SEE ME". The sequential display followed by a flash of the full expression is a hallmark of the present invention and the "SEE ME" product line. The method is preferably used in every application in which more than one word is employed. For example, in the case of "BIKE COURIER", the word "BIKE" might be centered above the word "COURIER" for space considerations. The preferred height of the letters in all signs is approximately three (3) inches, although other sizes can be utilized. In some applications, such as those for a roadwork crew, a larger size improves readability of the sign's words from a greater distance on the highway. A variety of ways may be used to attach safety alert sign 5 to a user's device (e.g., a roadwork sign) or conveyance (e.g., a bicycle or wheelchair), the wearer or their backpack, as any desired application dictates.

Referring again to FIG. 3, typically each safety alert sign 5 is made using one custom designed and fabricated printed-circuit (PC) board 75. Board 75 is preferably both a control board containing several CMOS devices for timing (e.g., clock), sequential logic (e.g., counting and display programming), and current switching. Board 75 is also a display board showing a custom layout of the displayed text message 10 (e.g., "SEE ME").

As can be appreciated, any desired word or words for text message 10 can be spelled out using yellow LEDs 15, or other colors of LEDs, on a custom PC board 75. For example, standard board 75 is specifically laid out to display text message 10 as "SEE ME". Boards 75 can be laid out to display other text messages, or employ languages other than English. Any such board 75 can then be stuffed or surface-mounted with the super-bright LEDs 15 and wave soldered by machine. This enables high-volume production of safety alert sign 5 with equipment that minimizes defects, simplifying testing and quality assurance. Preferably, each different text message version is manufactured on a custom board 75. For example, boards 75 may be designed with a text message 10 to read "CYCLIST", "RUNNER", "WHEEL CHAIR", "STROLLER", and so on.

The control logic electronics is generalized to meet the requirements of all applications. Nickel-Metal Hydride (NiMH) batteries 60 provide a deep cycle for the use of safety alert sign 5 over a period of several hours.

Functional Description of the Invention

Safety alert sign 5 is an electronic device that preferably employs analog and digital discrete components and integrated circuits in a driver control module which illuminates specific, custom-made, attention-getting, warning text messages 10 using state-of-the-art, high-brightness LEDs 15. Safety alert sign 5 is unlike any other personal warning device in existence today. Safety alert sign 5 is preferably used on a person, on their conveyance, or as a handheld warning device, or for placement on a surface that enables optimal display. The domain of applications is potentially broad, but is initially specific to providing a medium for warning oncoming drivers that a person must have their attention as they are sharing the roadside.

Control and Display Board

Figure 9:
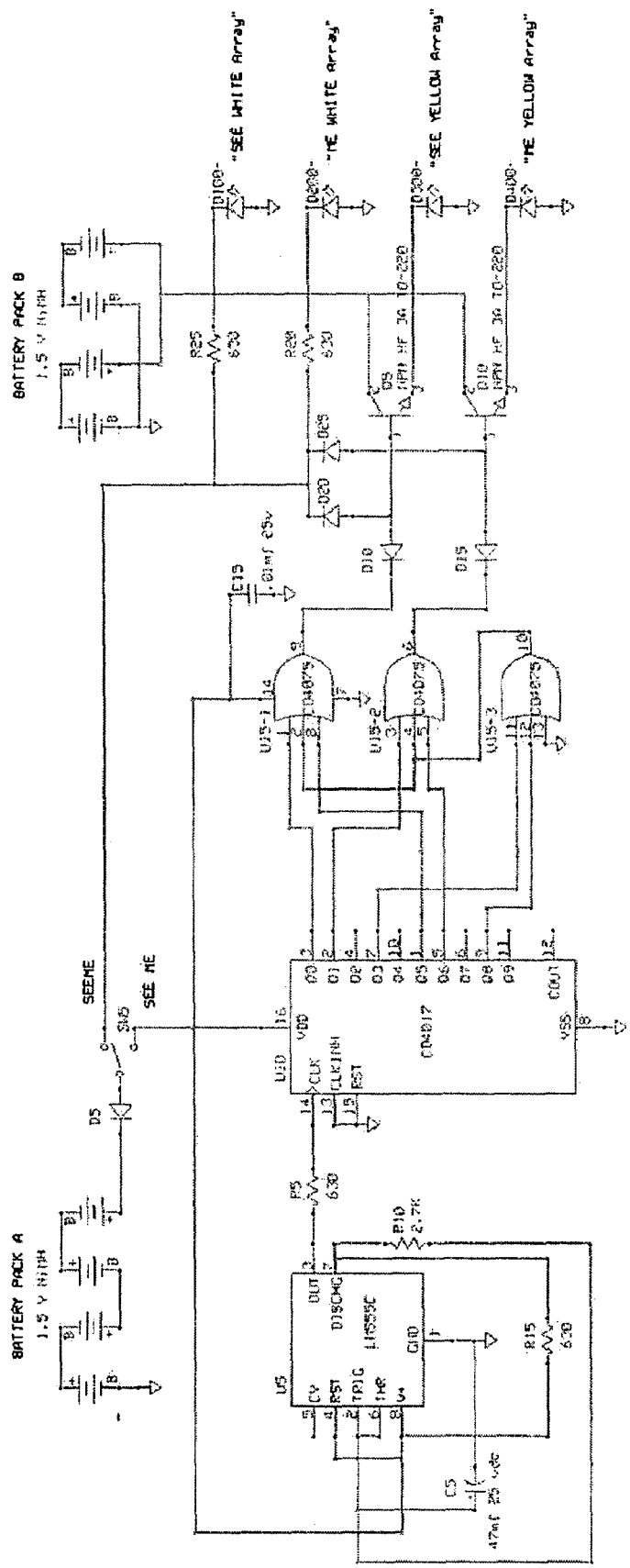
FIG. 9 shows a preferred circuit diagram for the novel safety alert sign shown in FIGS. 1-8.

Referring now to FIG. 9, there is shown a printed circuit board schematic 80, which is a description of the control and display board electronics in one preferred embodiment of the present invention. For convenience of description, safety alert sign 5 is discussed in the context of displaying the aforementioned "SEE ME" sign, although other displays can alternatively be provided.

Looking at FIG. 9, all of the logic devices used in the Control Board (U5, U10, U15) are preferably CMOS (Complimentary Metal-Oxide Semiconductor) devices, which have the smallest possible current requirements, enabling maximum battery life. These CMOS devices are also designed to operate consistently over a wide range of operating voltages, enabling reliable operation even over a period of hours during which battery voltage and current output are declining as a result of use. The design specifically segregates two sets of batteries (Battery Pack 50 and Battery Pack 55), for different, but complimentary purposes. Battery Pack 50 produces a nominal 6 volts DC to power the digital logic in the control circuits. With a full charge in batteries 60, the pack 50 output voltage ranges as high as 7 volts DC. It takes many hours to deplete batteries 60 in pack 50, and the CMOS control circuits enable stable and reliable performance of the device, down to a level below 2 volts DC.

Battery Pack 55 produces a nominal 3 volts DC. The batteries are wired in parallel to provide the longest possible duration of use. These batteries power yellow LEDs 15, whether they are flashing, or illuminated full time as the work light. In flashing use, batteries 60 in pack 55 will provide 5 hours of a bright, visible textual warning. The "redundant energy design" feature of this device means the following. If a user experiences an unexpectedly long trip during darkness or poor weather, and the yellow LEDs 15 appear to be growing dim, the user can switch the two sets 50, 55 of four batteries 60 with one another, and the safety alert sign 5 will again produce another five hours of a bright warning. This is because the control circuits use so little current and operate correctly at even a diminished voltage level. If this battery swap occurs, the circuits on either side will operate off the two battery packs 50, 55 similarly to two fresh sets of batteries 60.

This same method can be used if the user is engaged in performing a repair that requires the work light mode. If yellow LEDs 15 begin to dim, the same battery swap can be performed to give additional hours of service in the work light mode.

To provide a third mode of redundancy, in the event of a worst-case scenario where work lights 25 are being used with a prolonged need for white light, even after one battery swap and all yellow LEDs 15 are extinguished, the two sets 50, 55 of batteries 60 can again be swapped, and white LEDs 40 again provide useable light for yet another period of time. This "redundant energy design" feature is superior to other lights, such as headlights and flashlights, used by cyclists, which are generally one-shot in nature; once the energy from a single battery pack is consumed, these lights are dead. With safety alert sign 5 of the present invention, when one absolutely needs to see or be seen in the dark, a "redundant energy design" could be priceless.

In a preferred embodiment of the present invention, an LM555C timer (U5) enables the circuit to self-start when power is applied. The timer controls the rate at which a CMOS CD4017 Decade Counter (U10) is triggered. The counter outputs are set high in sequence for every clock pulse applied from the timer. These 10 independent outputs are selected to drive a pair of CD4075 3 input "OR" gates. Using the outputs on pins 3, 2, and 1, the "OR" gates are set to high, which allows a current to pass, when counter values of 0, 1, and 5 (Q0, Q1, Q5) appear at the outputs. An "OR" gate passes a high output state when any of its inputs are set high. So when Q0 goes high, pin 9 of the CD4075 goes high. When Q1 goes high, pin 6 of the CD4075 goes high. When Q5 goes high, both pin 9 and pin 6 go high. Pins 9 and 6 drive the bases of series pass transistors (Q5 and Q10). These transistors supply current to the words "SEE" and "ME" in the display board.

A transistor operates as a high-speed switch in this case. When a high level is applied to the base of either transistor, it switches ON permitting current to flow through the LEDs in that portion of the sign, illuminating the LEDs. In this configuration, the transistor has a higher current handling capacity than the output pins of the "OR" gate. In effect, the transistors switch on a higher current source for the LEDs when they are turned ON by a smaller current from the "OR" gates.

The frequency (clock rate or speed) of the timer determines the speed at which the counter cycles through each of its 10 outputs. Selecting from those counter outputs (in this case, outputs 0, 1, and 5) enables control of the visual sequencing with which the LED words flash on and off. When the counter's 0 output value is high, the word "SEE" is illuminated. When the counter's 1 output value is high, the word "ME" is illuminated. When the counter's 5 output value is high, both of the words "SEE" and "ME" are illuminated. Visually, in the "SEE ME" version of the product, the word "SEE" is flashed on, then off. Then the word "ME" is flashed on, then off. This is followed by flashing both words "SEE ME" on, then off. The timing of the on/off sequence for the words looks optimally balanced using outputs 0, 1, and 5 from the counter, but the remaining available outputs enable a degree of flexibility in programming the display of words in signs with a range of up to several words. The control board preferably comprises additional exact duplicates of the current switching transistors so each word has a corresponding driver.

This cycle of the sign's warning text flashing on and off begins when power is applied, and repeats as long as power is applied. The practice of flashing high-brightness LEDs 15, which already have small current requirements, dramatically improves the duty cycle of the device. That is, optimal visual impact is achieved with minimal current drain, which would be much greater if LEDs 15 were constantly on. In this way, maximum flashing visibility impact is available for the longest possible time on a fully charged battery. Preferably, the design of safety alert sign 5 is specifically tuned to match easily available, retail batteries with selected components and LEDs that require zero energy loss through voltage regulation or heat dissipation.

Safety alert sign 5 preferably employs 3500 millicandle (mcd) LEDs, with an effective visibility cone of 45 degrees.

This brightness enables excellent visibility under wide-ranging conditions, and from a wide range of viewing angles. Compare this with LED brake lights now used in new city buses. Their cone of visibility, at about 10 degrees, is so narrow that the brake LEDs cannot be seen well other than from straight behind the vehicle.

This design of the analog, sequential, and combinational logic is designed for durability and long life. It can also be extended to offer further, component-level redundancy in very high-risk applications, at minimal cost, by installing duplicate components in parallel. The super-bright LEDs themselves have an inherent long life typically on the order of decades under continuous use.

Important Design Considerations

The visibly displayed effect of purposeful, blinking text has not been utilized in any commercial personal safety product intended to provide a visible warning.

Preferably, safety alert sign 5 uses the very latest high-brightness LEDs, now available in a range of colors, intensities, and cones of visibility. Safety alert sign 5 preferably uses all common, low-cost CMOS devices so there is no need for regulating the voltage for the devices, and no need for level translations, for example, between TTL and CMOS devices. This enables the device to continue to operate under harsh conditions, such as when the battery is dropping in voltage due to an extended period of use. This provides the critical ability to operate with very gradually reducing brightness, literally when the battery voltage has degraded over a long period of time, instead of just failing if the voltage supplied is outside a narrow range of operability. This results in an extended operating time that could be life-saving. With a good NiMH battery charger, battery recovery is extremely fast. With quick-rechargeable batteries, and a quick-charger, a full recharge can occur in a period of minutes.

Preferably, safety alert sign 5 uses super-bright LEDs, a CMOS 555 timer, a CMOS 4017 counter, a CMOS 4075 Triple 3-input OR gate, two D966 NPN transistors, plus five Schottky Barrier current blocking diodes to block unwanted reverse currents in the event that a user reverses the batteries and devises a way to force a closed circuit from the battery packs, and various standard value resistors and capacitors as shown in FIG. 9. Equivalent components from alternate suppliers could be substituted as long as performance specifications are substantially equivalent. Customarily, multiple electronic component manufacturers make parts with similar nomenclature and equivalent specifications.

For the purpose of safety-warning safety alert sign 5, the electronics are as simple as possible for the performance, reliability, programmability, and durability required. Preferably, some or all of the control logic is reduced to an Application-Specific Integrated Circuit (ASIC) for cost-effective production in high volumes.

Traffic Director Device

Figure 10:
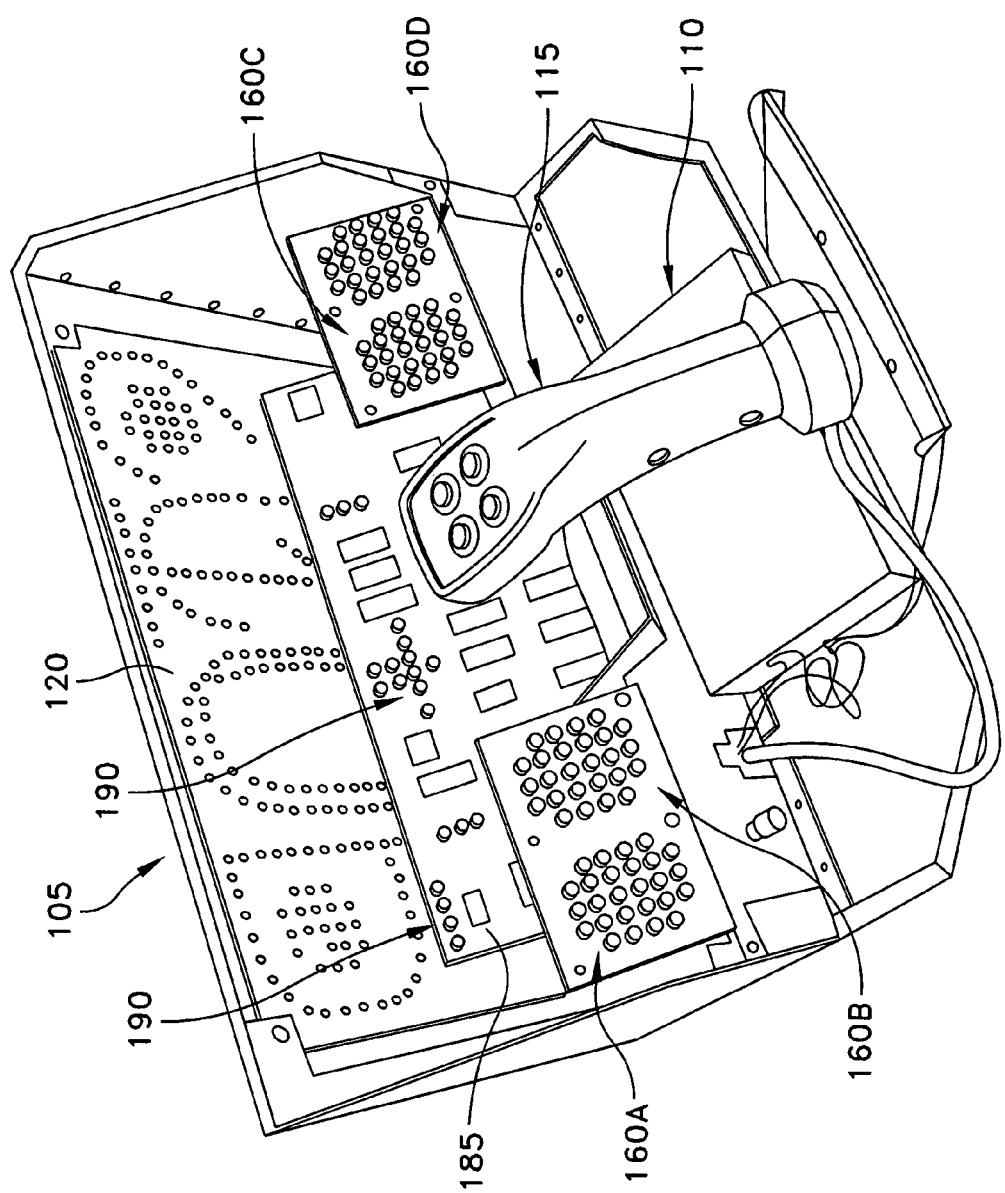
FIG. 10-26 show a novel traffic director device formed in accordance with the present invention.

Referring now to FIG. 10, there is shown a "traffic director" device 105. Device 105 is a portable traffic light for hand-held use by traffic officers, flagmen, customs agents, or other individuals who might be directing traffic at busy intersections during work let-outs, road projects, roadblocks, or after major sporting events. Device 105 is used in any traffic management application where the user needs to get attention and to be seen day or night for both traffic control and personal safety purposes. Preferably, device 105 is a 12-volt DC version that is run from a single, flat Sealed Lead-Acid (SLA) battery 110. Battery 110 is shown anchored into place just below a control handle 115. Device 105 is designed to be operated off a 12-volt DC automobile battery (not shown) as well as battery 110. This is preferably done by plugging a power cable into an adjacent cigarette lighter, or a 12-volt port such as those on police cruisers.

Alternatively, device 105 is powered by a Nickel Metal-Hydride (NiMH) battery pack, as described above with safety alert sign 5. In both cases, batteries 60 and battery 10 are rechargeable up to 1000 times and can be quick charged. For device 105, in the NiMH battery pack model, if no electrical supply is available for charging, then common "D" cells may be substituted at any time.

Figure 11:
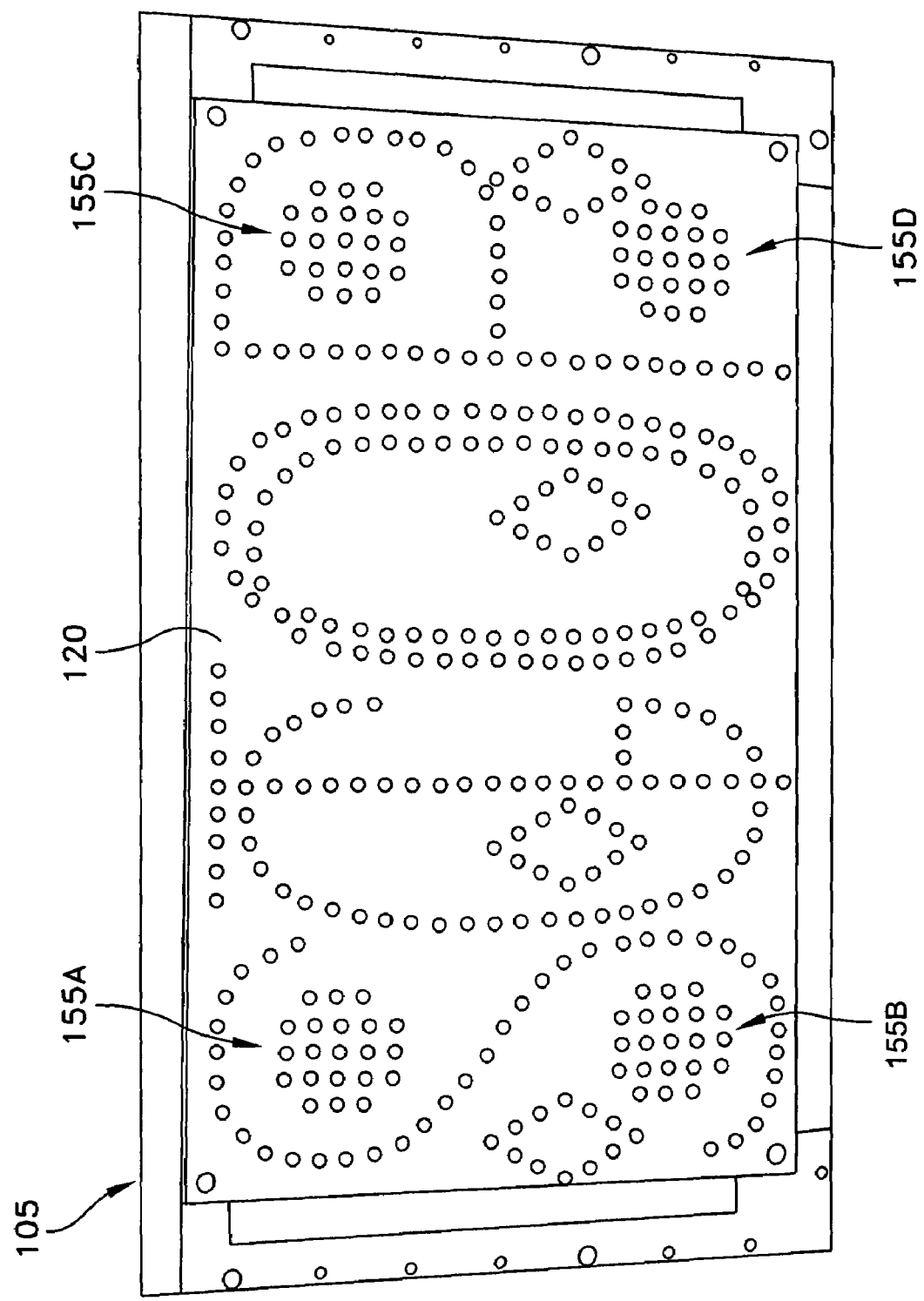

Looking at FIG. 11, the device 105 employs high-brightness LEDs coupled with a novel control printed-circuit board 120 to display both warning signs to, motorists, as well as other lighting for use as a spotlight or floodlight by a traffic officer or other user.

Figure 12:
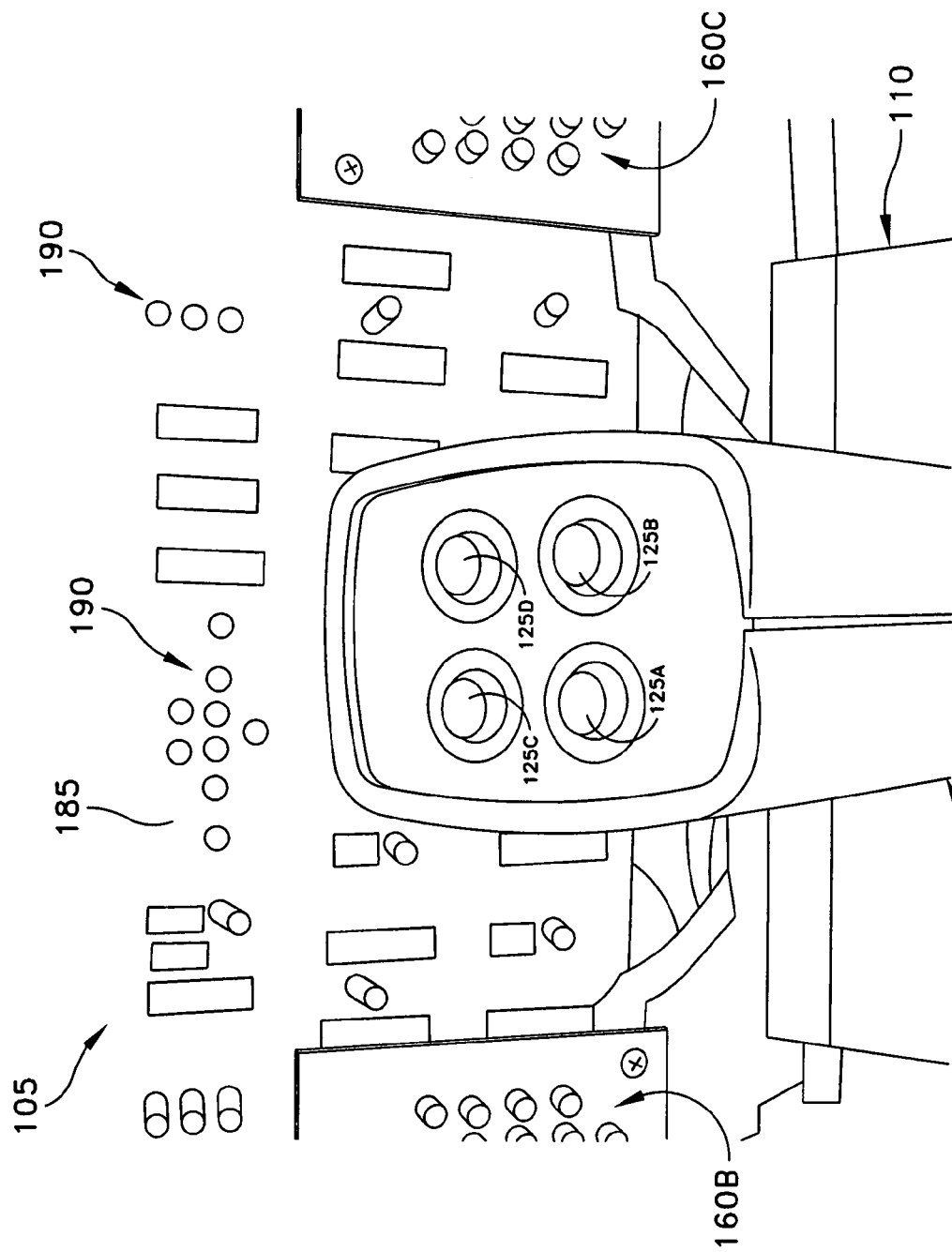
Figure 13:
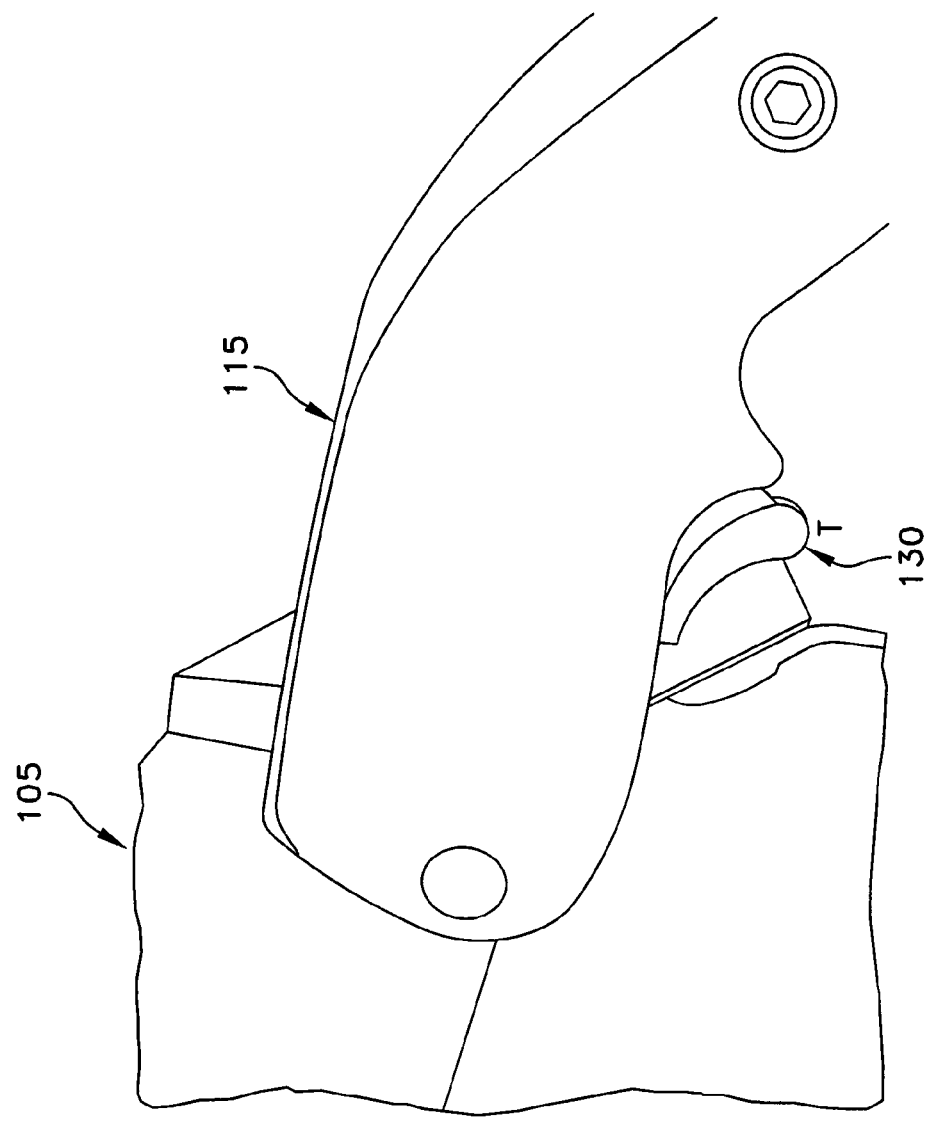

Referring next to FIGS. 12 and 13, control grip 115 employs four thumb buttons 125A, 125B, 125C, 125D on top, plus a single trigger switch 130. These controls enable the user to turn on and off a number of functions, as the needs of the user dictate. Some preferred features/functions are described herein.

Figure 14:
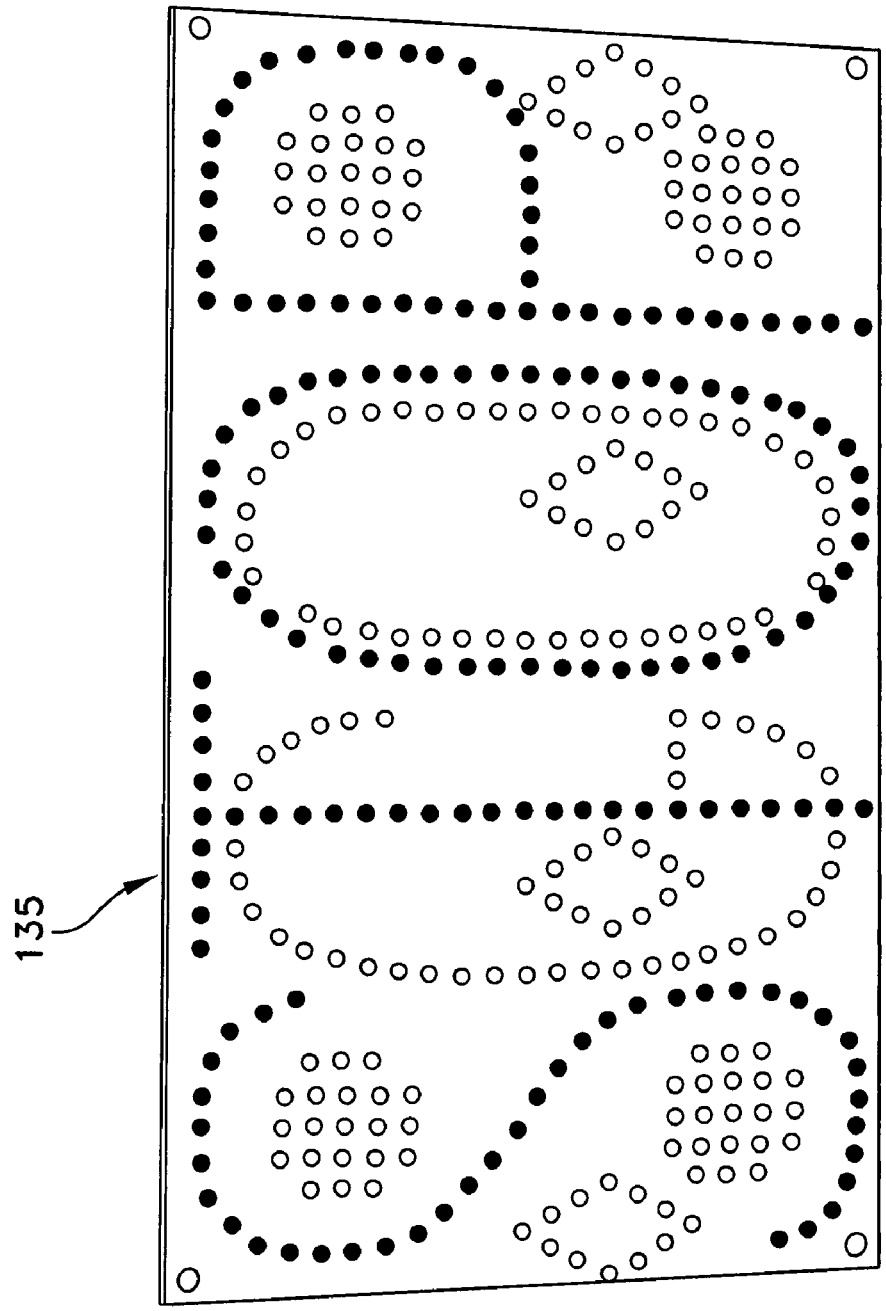

Referring to FIG. 14, there is shown a bright red "STOP" sign 135 displayed on circuit board 120 (FIG. 11). Preferably, the large letters of sign 135 measure 7"×11".

Figure 15:
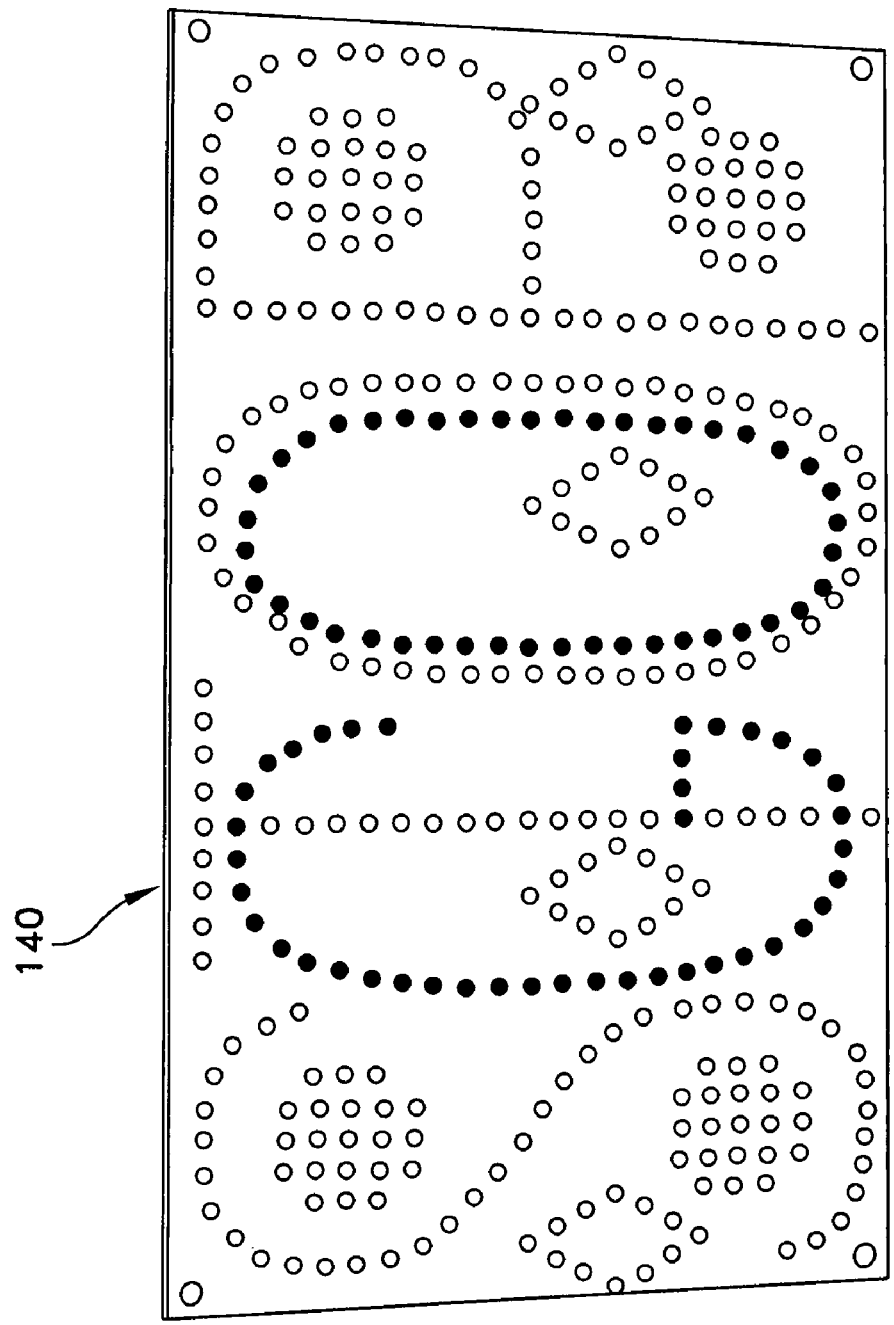
Figure 16A:
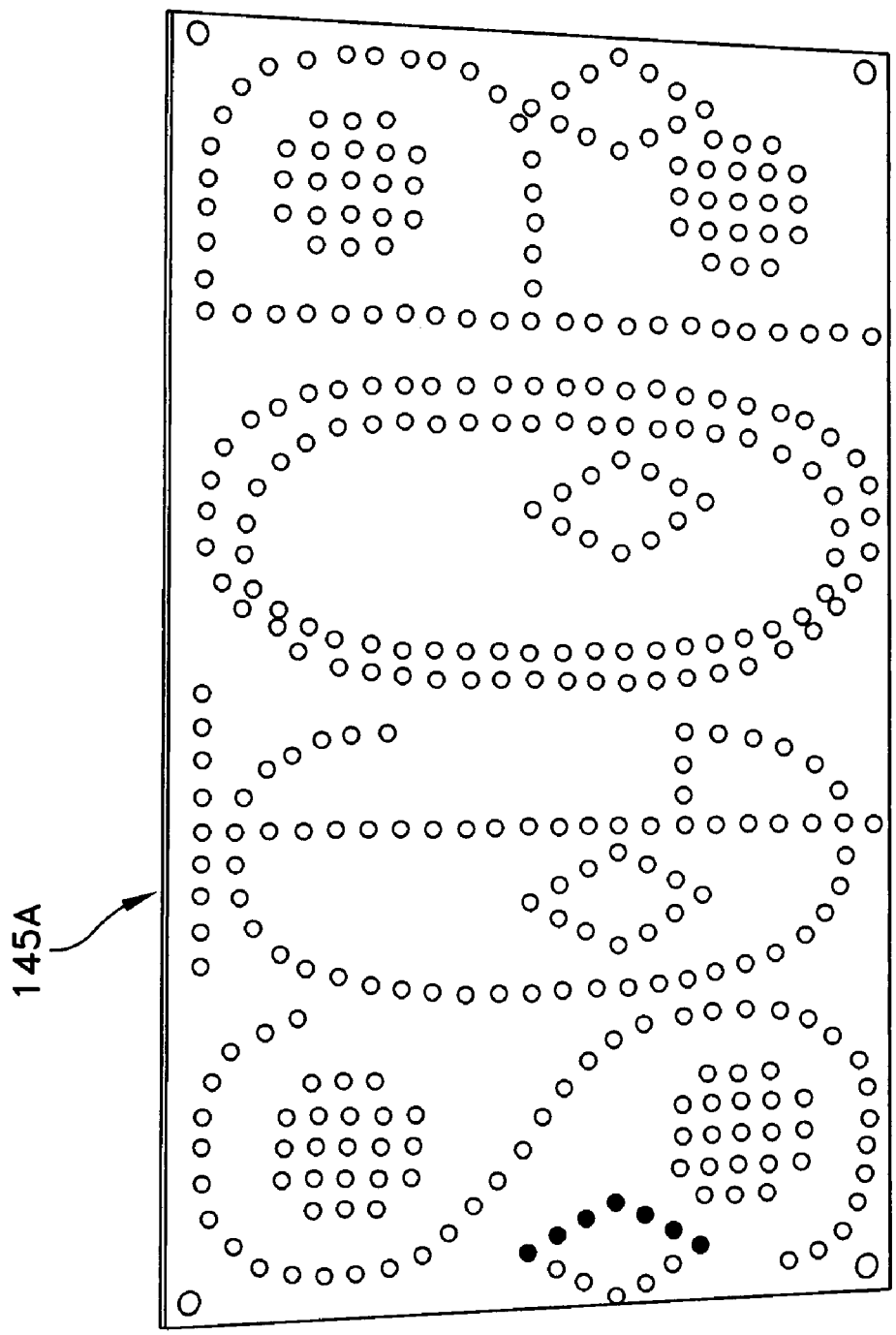
Figure 16B:
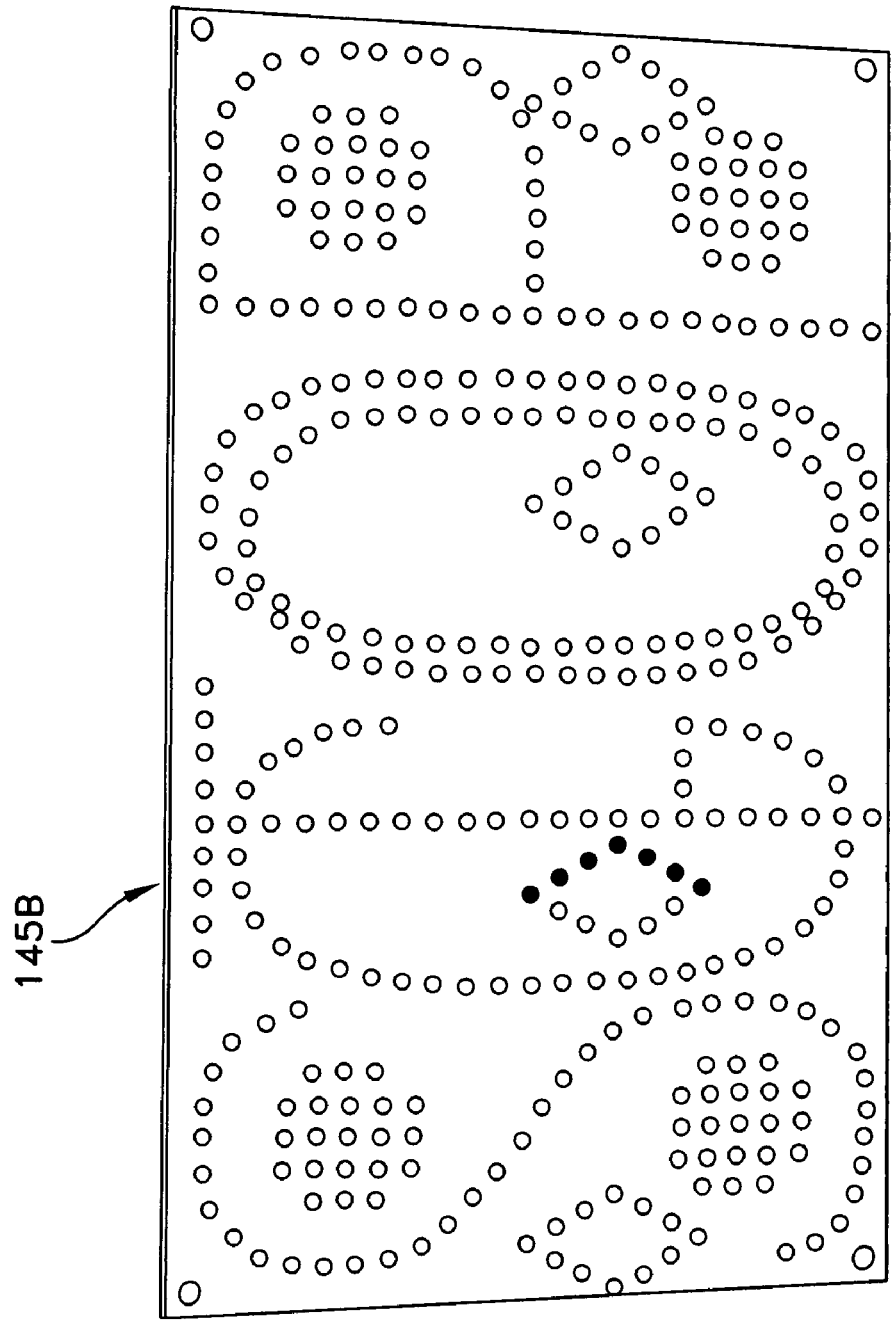
Figure 16C:
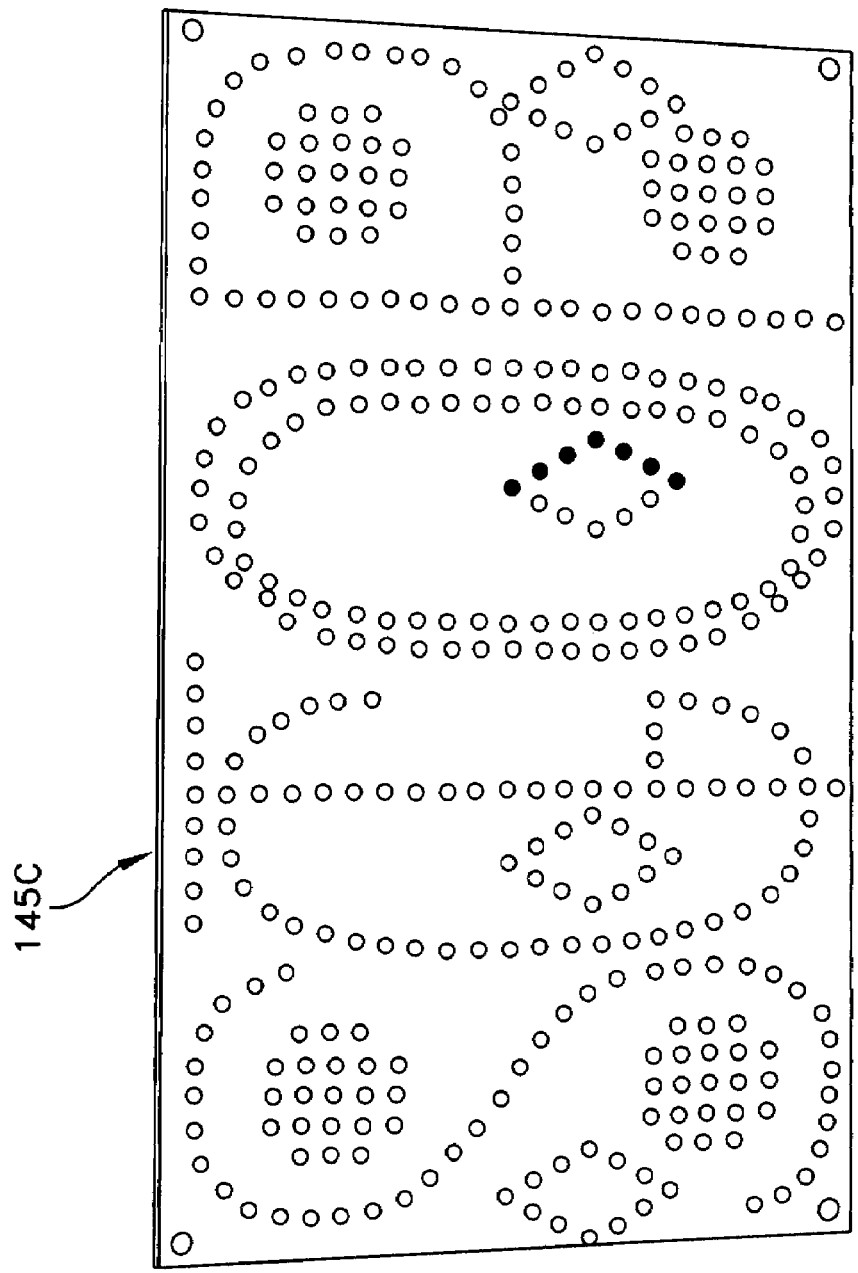
Figure 16D:
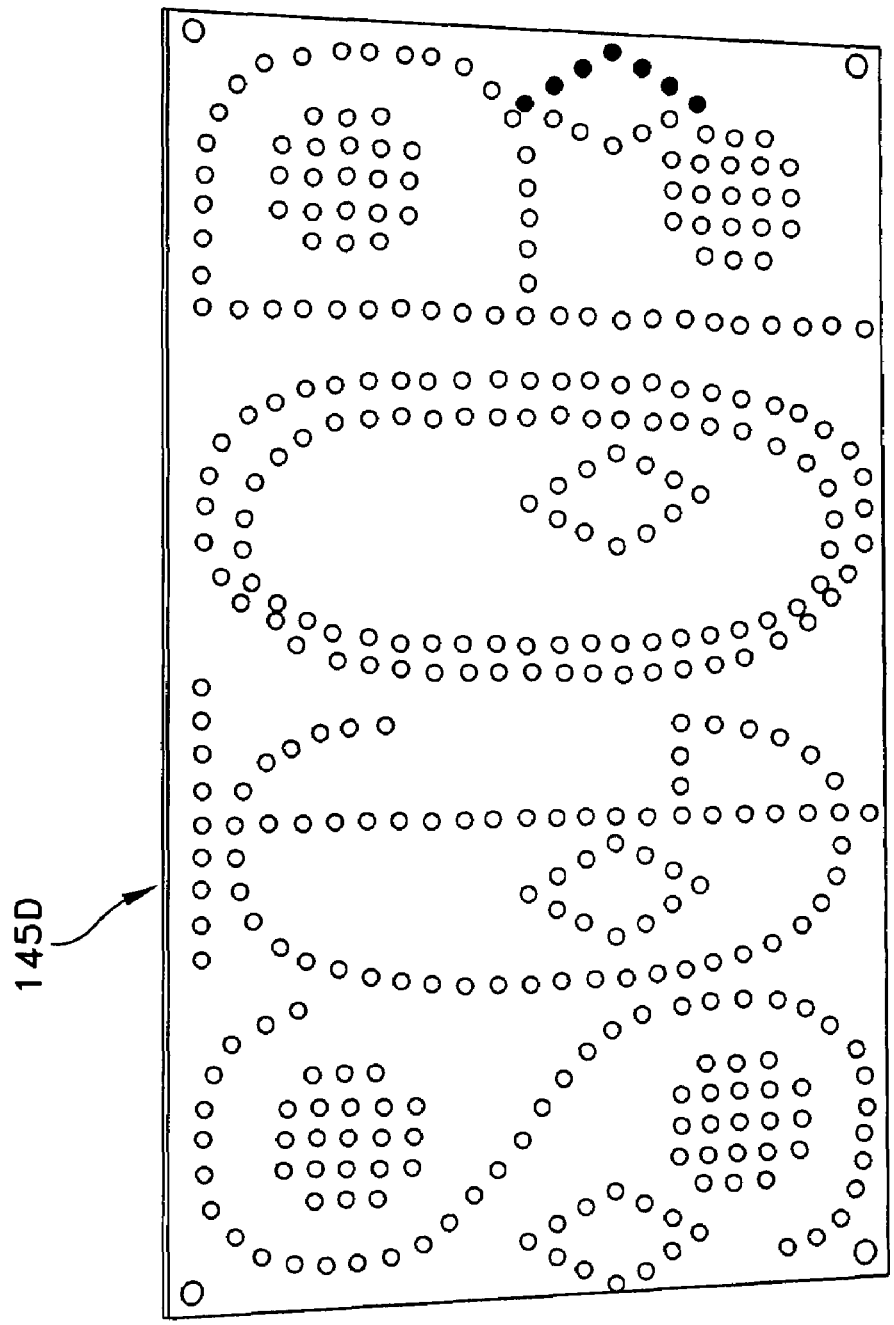
Figure 17A:
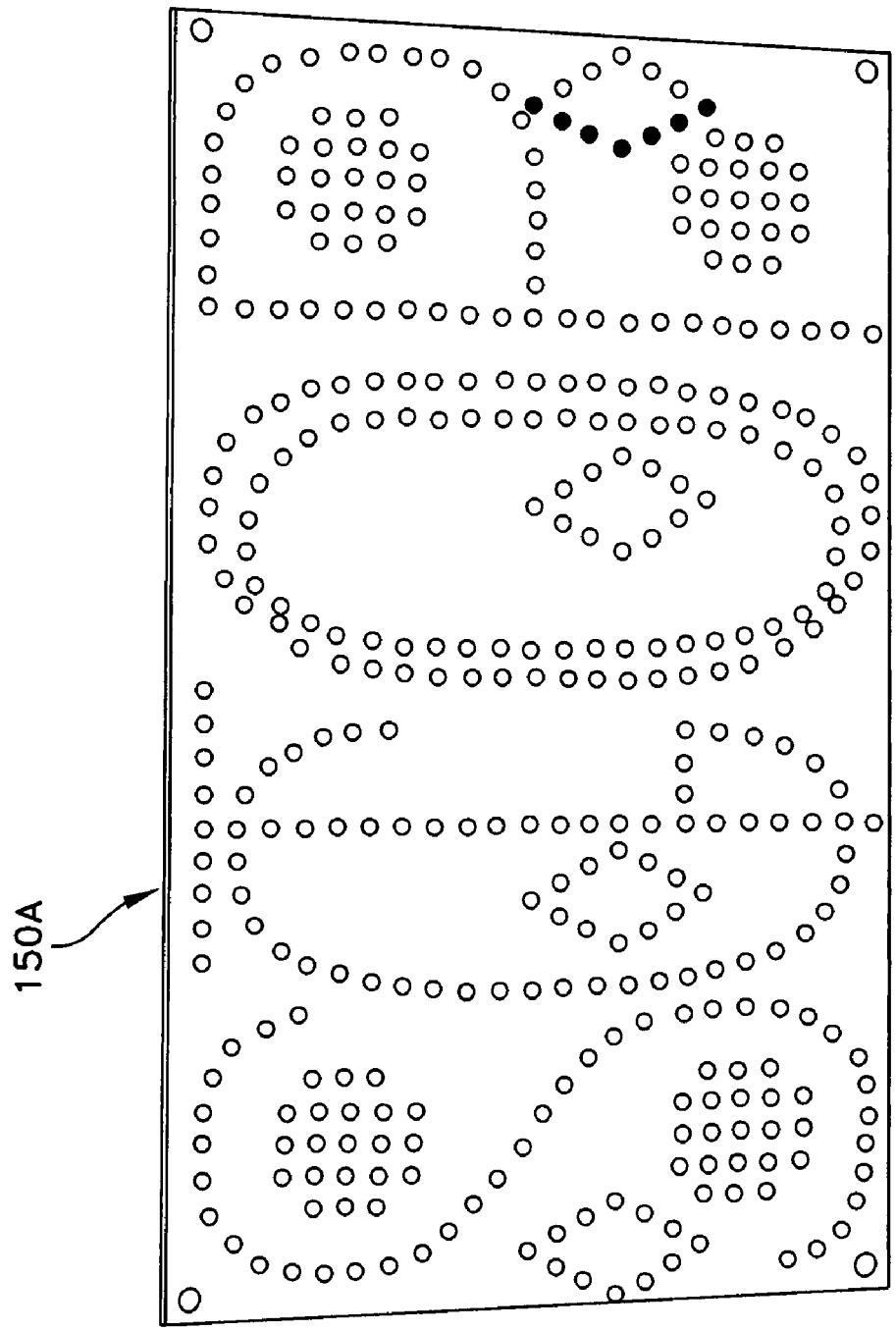
Figure 17B:
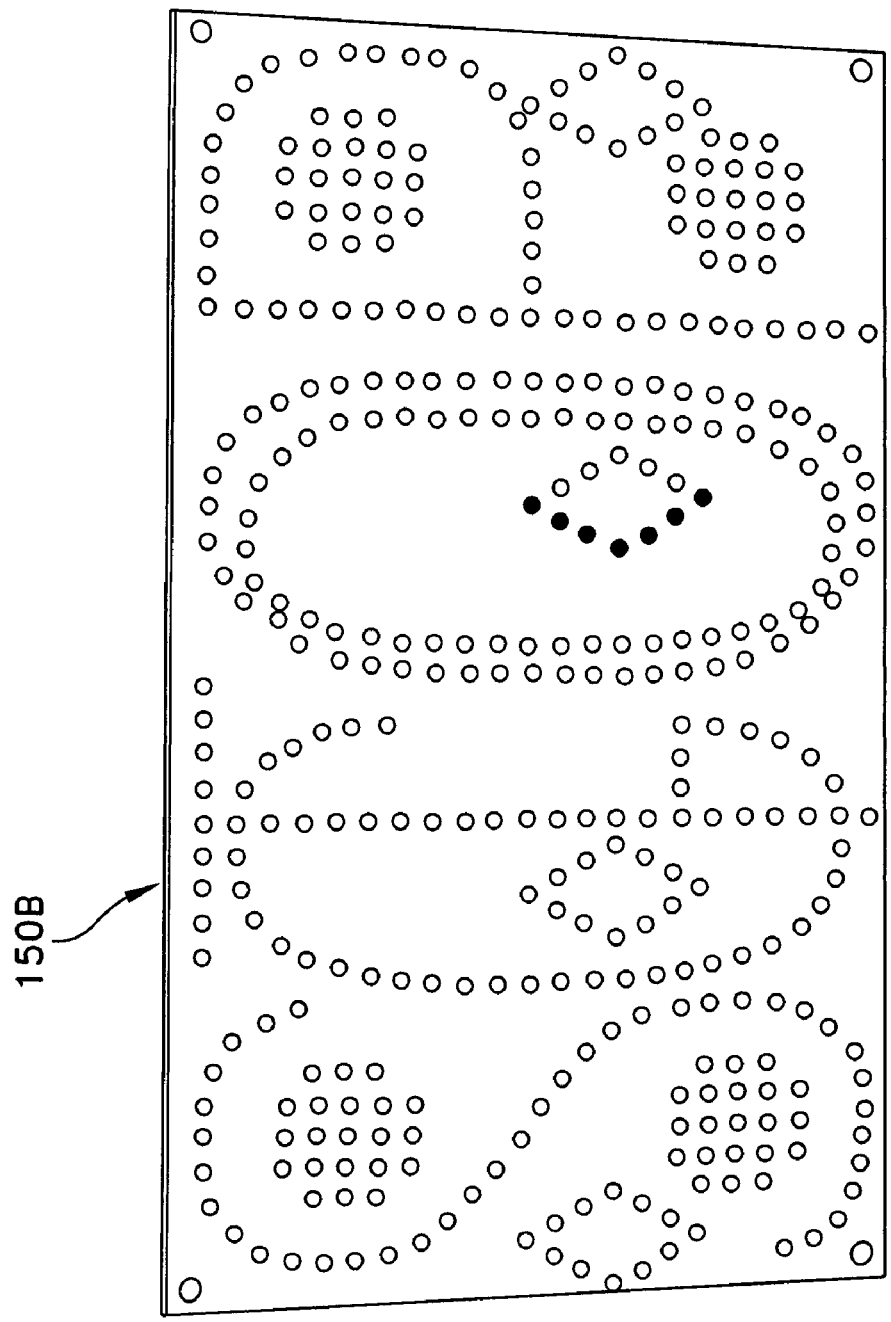
Figure 17D:
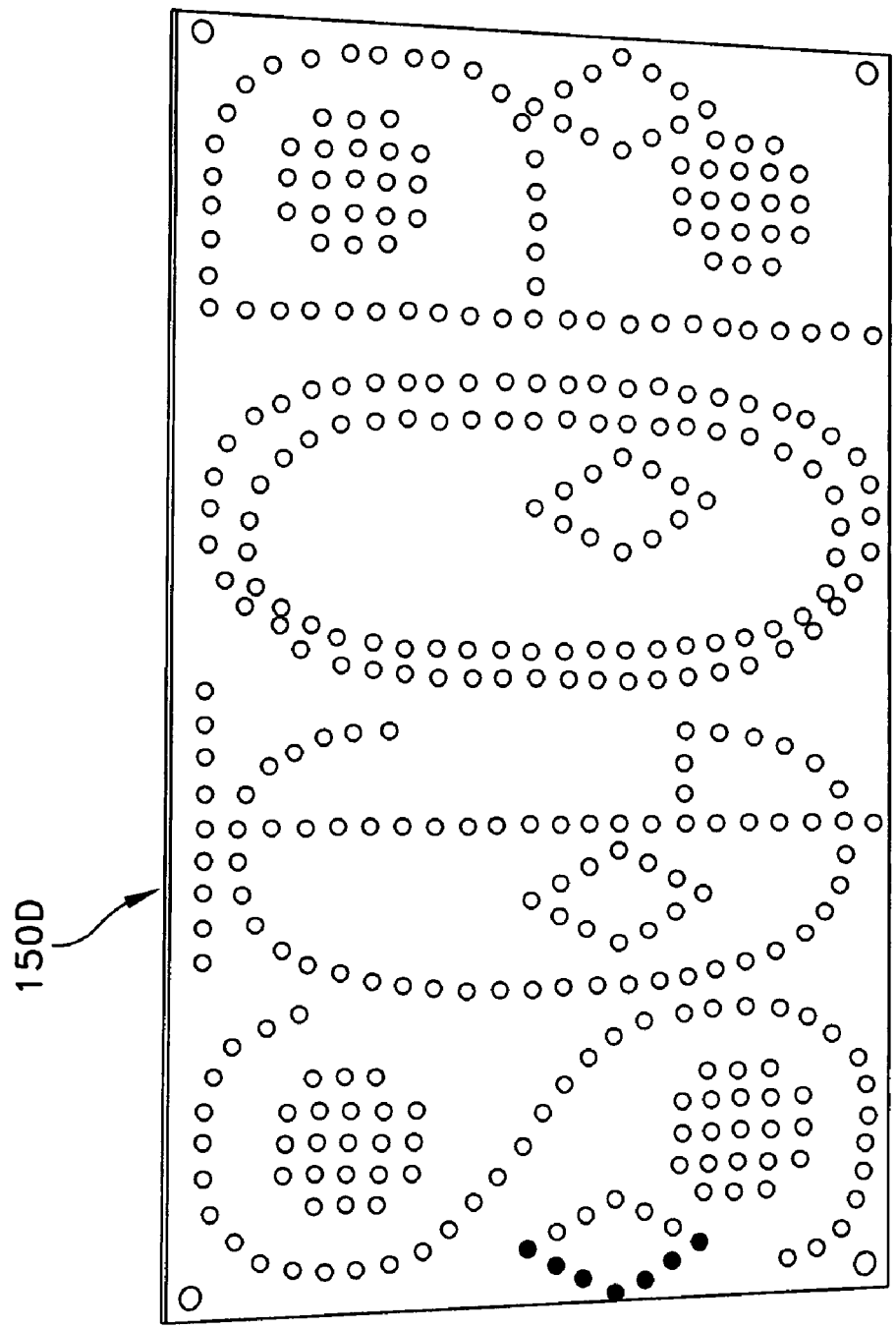

Referring to FIG. 15, there is shown a bright green "GO" sign 140 displayed on circuit board 120 (FIG. 11). Preferably, the large letters of sign 140 measure 7"×6".

Referring to FIGS. 16A-16D, there are shown scanning green arrows 145A, 145B, 145C, 145D displayed on circuit board 120 (FIG. 11) so as to instruct a driver to turn right as scanning green arrows 145A, 145B, 145C, 145D are sequentially displayed.

Referring to FIGS. 17A-17D, there are shown scanning green arrows 150A, 150B, 150C, 150D displayed on circuit board 120 (FIG. 11) so as to instruct a driver to turn left as the scanning green arrows 150A, 150B, 150C, 150D are sequentially displayed.

Figure 18A:
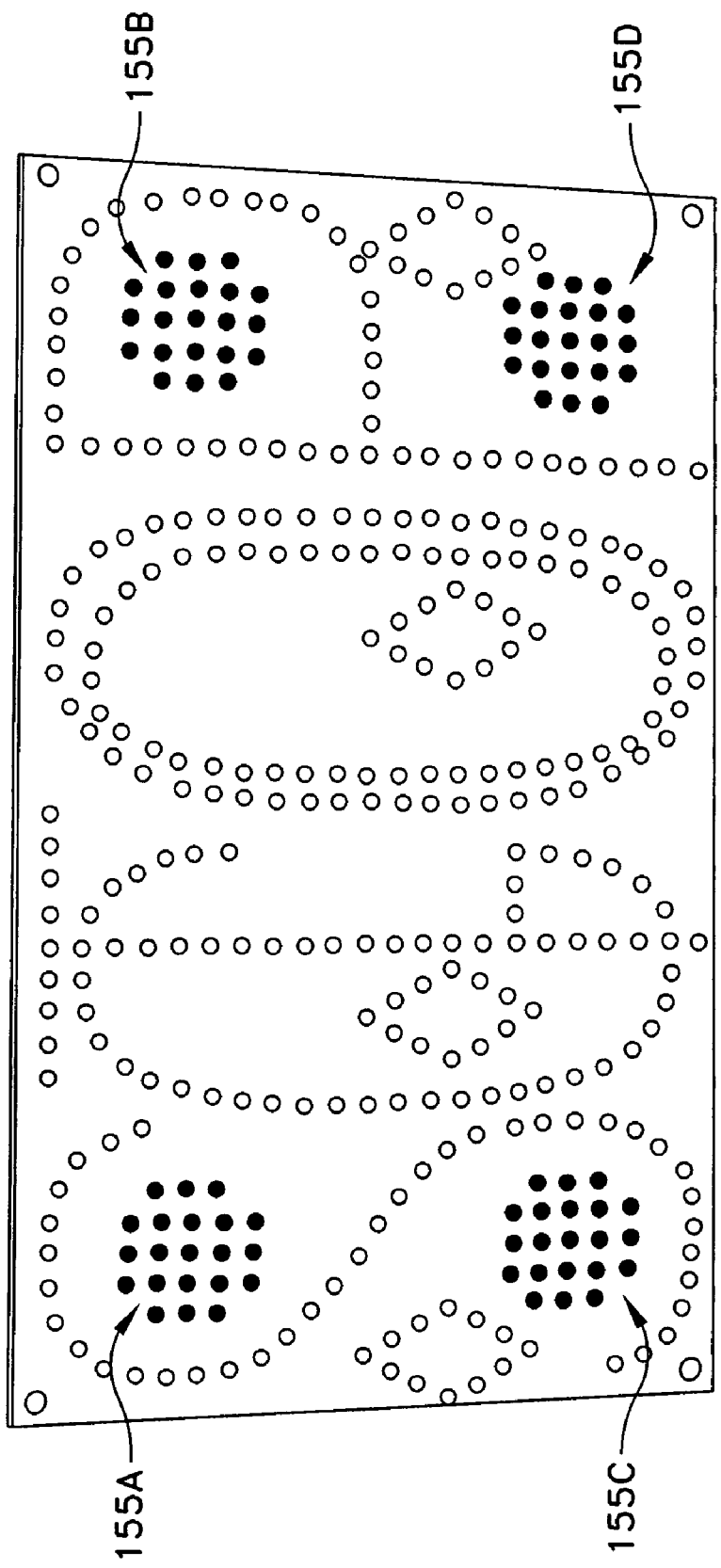
Figure 18B:
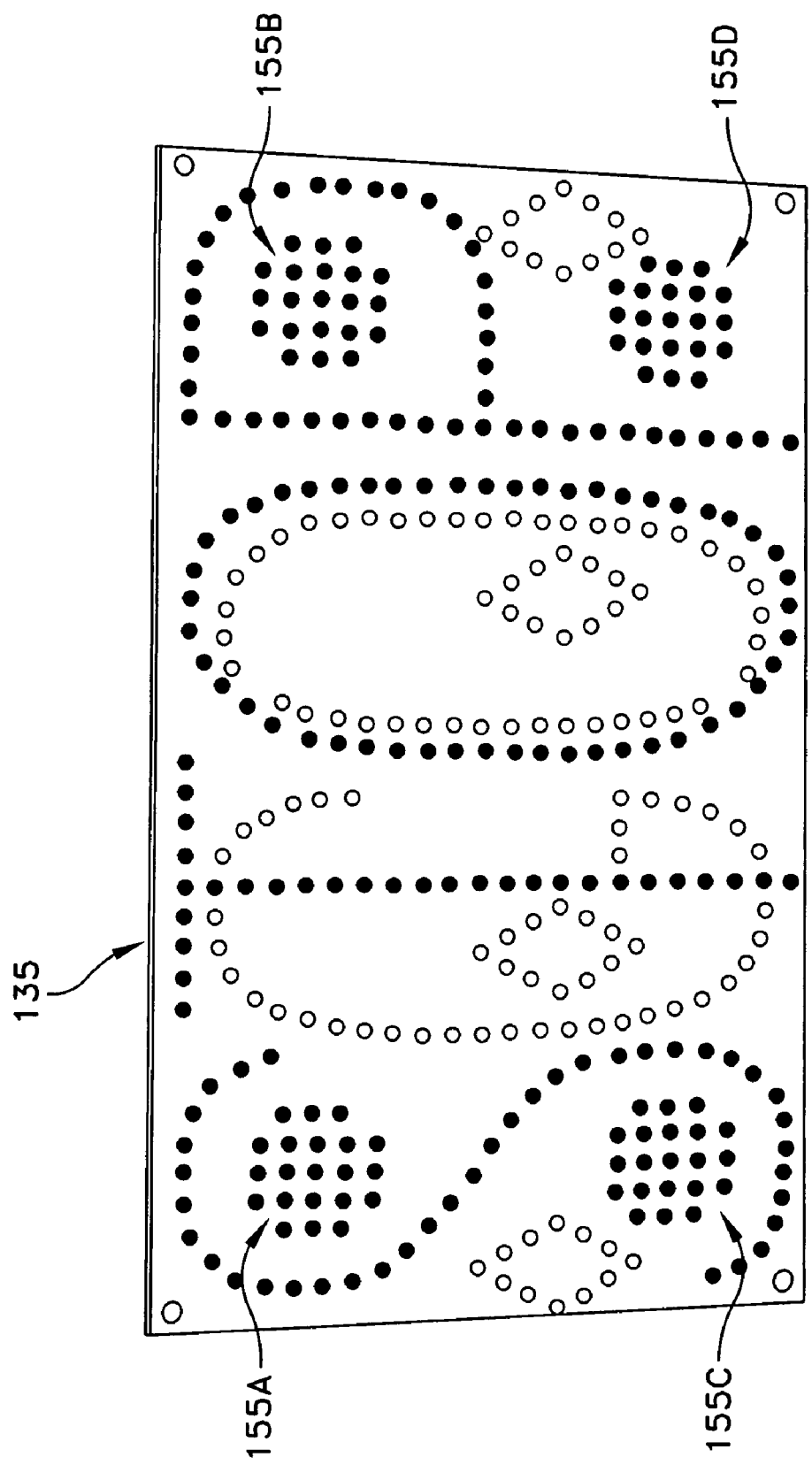

Referring to FIGS. 18A and 18B, there are shown four clusters of white LEDs 155A, 155B, 155C, 155D on the front of circuit board 120 (FIG. 11), for elective use as a powerful viewing light.

Referring again to FIG. 10, there are shown four clusters of white LEDs 160A, 160B, 160C, 160D disposed behind board 120 for elective illumination of the user's body. Preferably, two clusters 160A, 160B and two clusters 160C, 160D are selectable for illumination of right or left-handed users, respectively.

Figure 19:
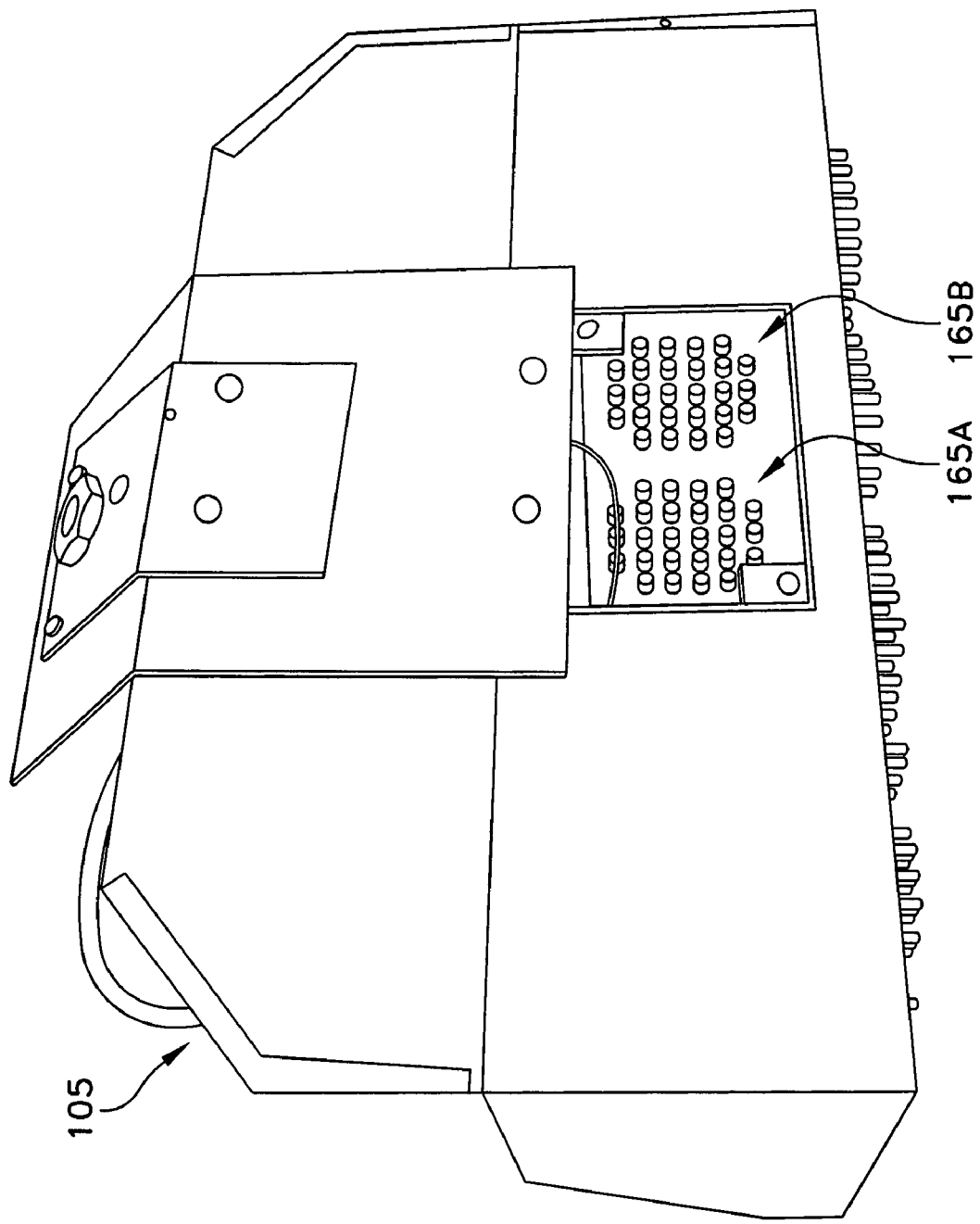

Referring to FIG. 19, there are shown two clusters of white LEDs 165A, 165B on the bottom portion of device 105 for elective illumination of the ground at the user's feet.

All of the critical operations that a user can perform with the device are interlocked between trigger 130 and buttons 125A, 125B, 125C, 125D. Accordingly, if board 120 is displaying "STOP" sign 135, a user cannot inadvertently push any button that will unexpectedly change board 120 to "GO" sign 140, and vice versa. These operations require the user to consciously press and hold a button 125A, while clicking trigger 130 once to change between "STOP" sign 130 and "GO" sign 140, or double clicking trigger 130 to turn off sign 120.

Looking at FIG. 12, there are shown top control buttons or thumb buttons 125A, 125B, 125C, 125D on control grip 115.

Looking at FIG. 13, there is shown a trigger control switch or index finger switch 125 on the bottom front of control grip 115.

Turning the device to "on" displays "STOP" sign 130 on board 120 in a steady blinking mode. (See FIG. 14.) The worst-case design assumption is that if a user needs to rapidly turn on device 105, the user might be in a situation where traffic needs to be quickly stopped for safety reasons.

If the user is in an emergency situation where an immediate emergency STOP needs to be signaled, then the user need only switch on device 105 and then point device 105 in the required direction. To gain every possible, immediate, attention-getting advantage, if the user clicks and holds trigger 130 within the next two seconds, the bright white viewing lights 155A, 155B, 155C, 155D are illuminated on board 120 (see FIG. 18B).

If a user is simply turning on device 105 for normal use, then the "STOP" sign 135 display mode can be viewed as an automatic self-test, indicating to the user that batteries 110 are charged and the device is in normal working condition.

To turn off "STOP" sign 135 display mode, and place sign 120 in a quiet state, and to wait for the next user control operation, the user simply presses and holds button 125A, and clicks trigger 130 twice.

Note that turning off sign display 120 in this manner again requires a conscious operation. The user must hold button 125A and click trigger 130 twice to turn off sign 120. This is an interlock to make sure the user does not inadvertently turn off sign 120 when standing in traffic.

All of the critical operations that a user can perform with device 105 are interlocked. This means that if sign 120 is displaying "STOP" sign 135, a user is less likely to inadvertently push any button 125A, 125B, 125C, 125D to unexpectedly change sign 120 to display "GO" sign 140, and vice versa. These operations require the user to consciously press and hold button 125A, while clicking or double clicking trigger 130.

To turn on "STOP" sign 140, the user presses and holds button 125A, and simultaneously clicks trigger 130 once again.

To switch the sign from "STOP" sign 135 (FIG. 14) to "GO" sign 140 (FIG. 15), the user must press and hold button 125A, and simultaneously click trigger 130 once.

While the sign is displaying "STOP" sign 135 or "GO" sign 140, and no buttons are pressed, and trigger 130 is not pressed, sign 120 blinks at a steady rate of 2 Hertz. To quickly get more attention from an inattentive driver, or oncoming traffic, the user can press trigger 130 and hold it as long as desired. This produces a "fast flash, then full on" cycle. The "fast flash" produces a bright flicker effect for one second, then sign 120 remains continuously lit until trigger 130 is released, at which time sign 120 resumes the 2 Hertz blink.

There are two ways to switch back and forth between the display of "STOP" sign 135 and "GO sign 140. The first is to press button 125A and hold it while clicking trigger 130 once. This method is used when switching from blinking "STOP" sign 135 to blinking "GO" sign 140, and vice-versa.

The second way is to hold the trigger 130, as in "full on", and then press button 125A. This method is employed when the user wants to end displaying steady "STOP" sign 135 to one lane of traffic and then immediately display steady "GO" sign 140 to another lane of traffic, or vice-versa.

To switch off sign 120, so device 105 is still powered on but sign 120 is displaying neither "STOP" sign 135 nor "GO" sign 140, the user presses and holds button 125A while clicking trigger 130 twice quickly, within one second.

This is a designed need for two fast clicks while button 125A is pressed and held. If the user is wearing gloves and inadvertently presses button 125A, and inadvertently clicks the trigger 130 at a slower rate, sign display 120 will remain on.

At any time the bright front viewing lights 155A, 155B, 155C, 155D can be illuminated. The user simply presses button 125B, and then within two seconds clicks and holds trigger 130. Viewing lights 155A, 155B, 155C, 155D will remain on as long as trigger 130 is held, in any display mode sign 120 is in either sign on or off. Lights 155A, 155B, 155C, 155D are powerful and convenient for looking into a stopped auto, inspecting cargo from the rear of a long trailer body, or for other purposes where bright illumination is required.

Referring to FIGS. 16A-16D, at any time the user can press and hold button 125C to display a scanning series of green arrows 145A, 145B, 145C, 145D on board 120 to stopped or oncoming drivers. Arrows 145A, 145B, 145C, 145D indicate that they are to make a right turn. Lights 145A, 145B, 145C, 145D are independent of "STOP" sign 145 and "GO" sign 150, and so can be used with or without "STOP" sign 145 or "GO" sign 150.

Referring to FIGS. 17A-17D, at any time the user can press and hold button 125D to display a scanning series of green arrows 150A, 150B, 150C, 150D to stopped or oncoming drivers. Arrows 150A, 150B, 150C, 150D indicate that they are to make a left turn. Lights 150A, 150B, 150C, 150D are independent of "STOP" sign 145 and "GO" sign 150, and so can be used with or without "STOP" sign 145 or "GO" sign 150.

Referring to FIGS. 20-25, the user can illuminate the ground at his or her feet or body using ground lights 160C 160D, right body lights 160A, 160B, and left body lights 160C, 160D, at any time, by pressing button 125B, and then pressing button 125A, to set up a choice of three "Improved visibility" lights as described herein below.

Figure 20:
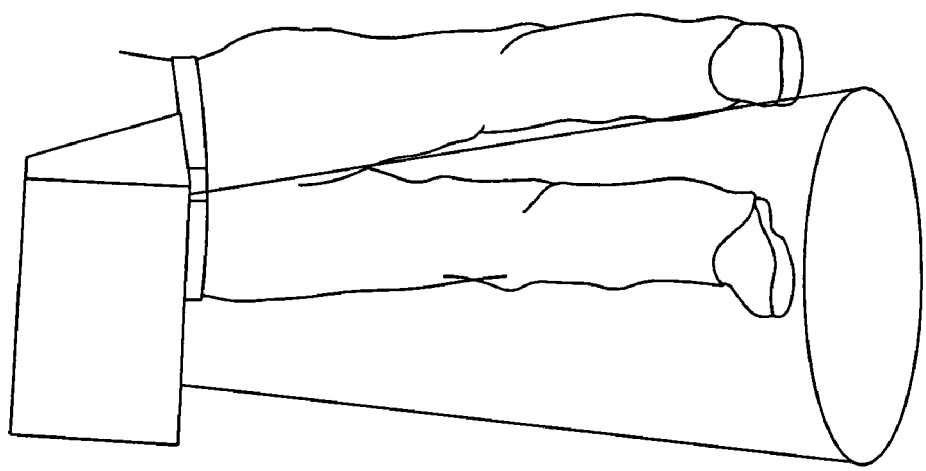

Referring to FIG. 20, there are shown ground lights 165A, 165B (FIG. 19) illuminating the ground at the user's feet.

Figure 21:
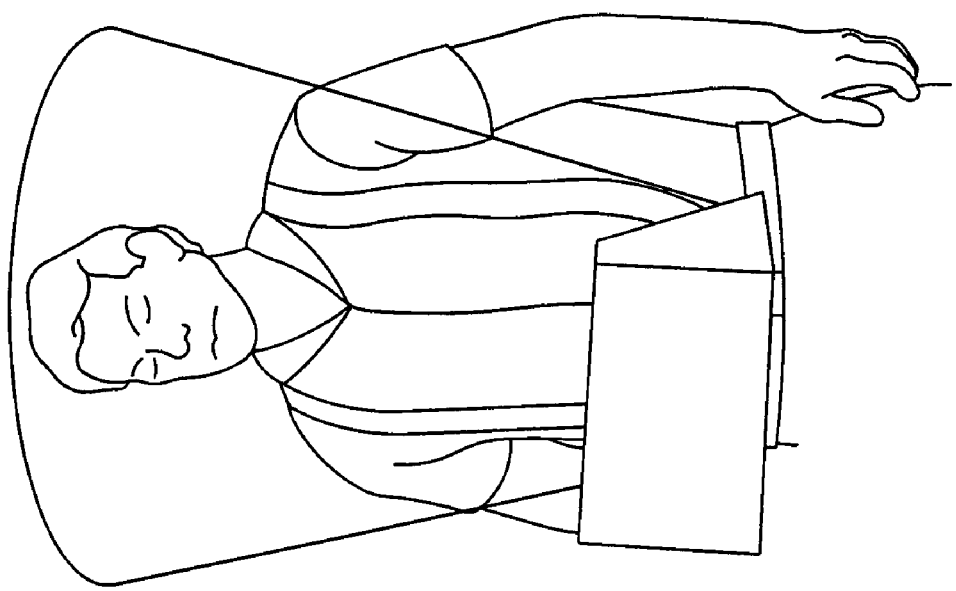

Referring to FIG. 21, there are shown right body lights 160A, 160B (FIG. 10) illuminating the body of a right-handed user.

Figure 22:
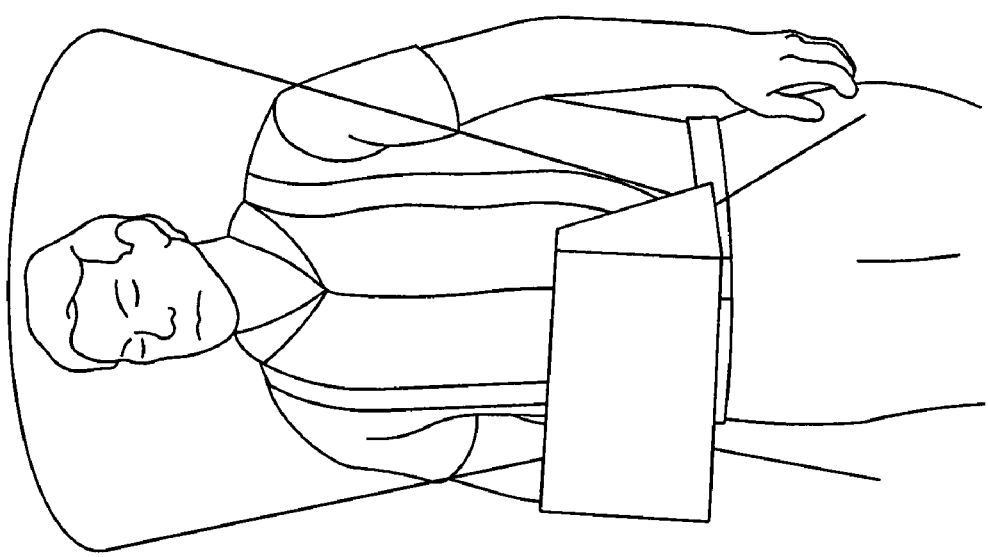

Referring to FIG. 22, there is shown left body lights 160C, 160D (FIG. 10) illuminating the body of a left-handed user.

Figure 23:
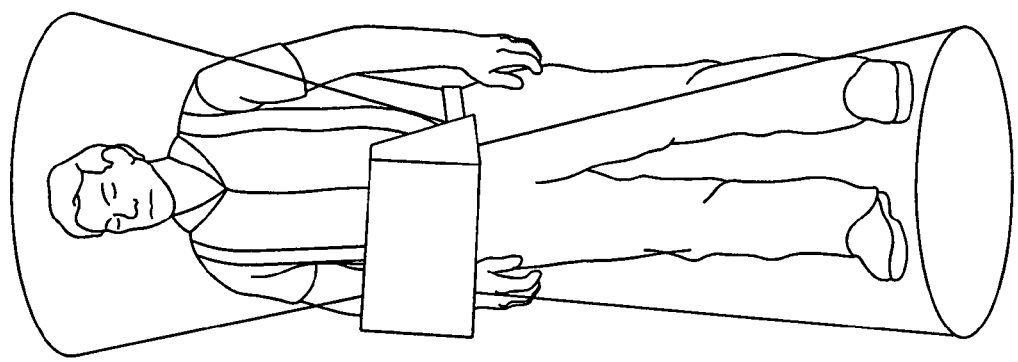

Referring to FIG. 23, there is shown ground lights 165A, 165B (FIG. 19) and right body lights 160A, 160B (FIG. 10) illuminating the ground and the body of a right-handed user.

Figure 24:
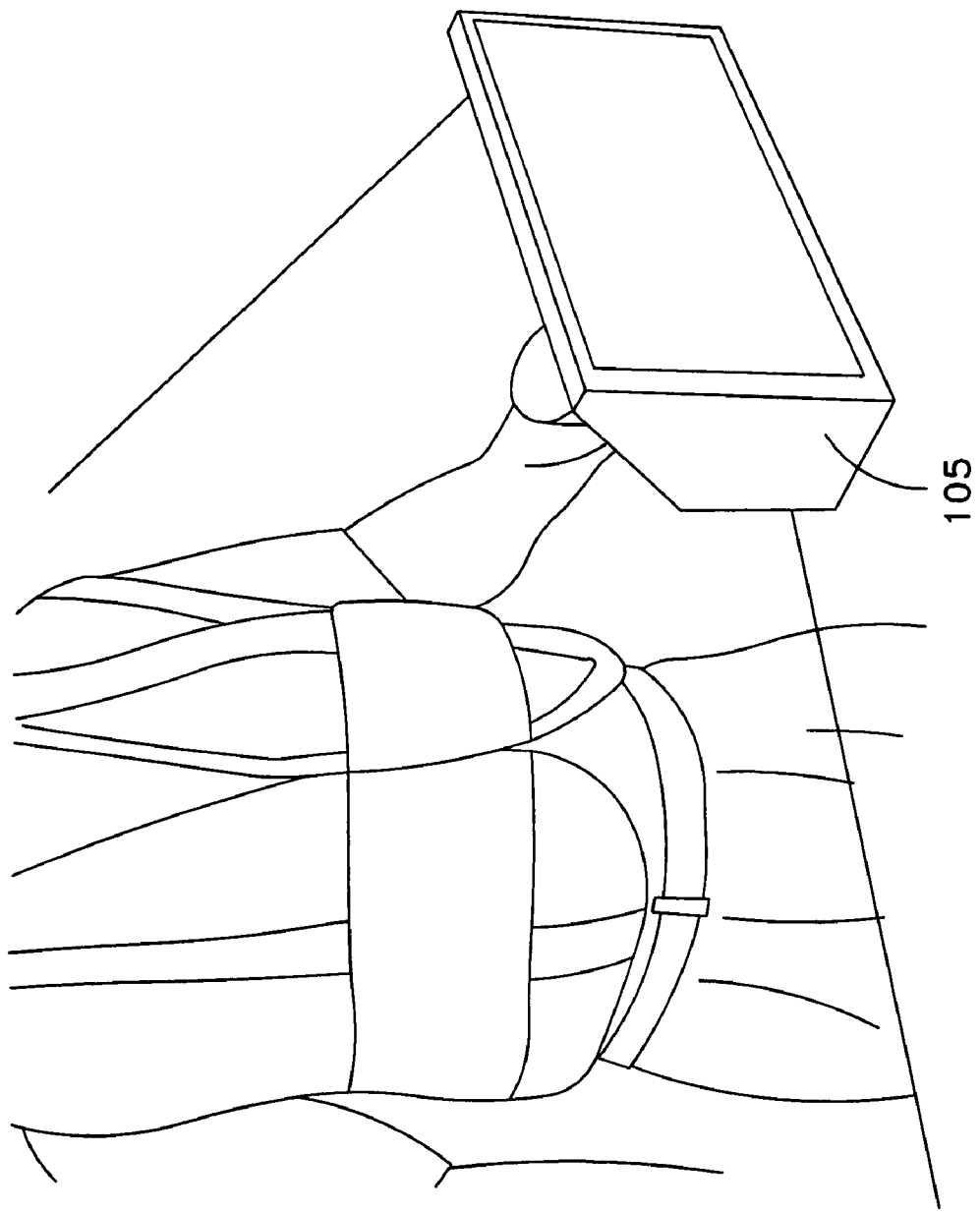

Referring to FIG. 24, there is shown ground lights 165A, 165B (FIG. 19) and left body lights 160C, 160D (FIG. 10) illuminating the ground and the body of a left-handed user.

Typically, ground lights 165A, 165B (FIG. 19) right body lights 160A, 160B, (FIG. 10) and left body lights 160C, 160D (FIG. 10) are not actuated during daytime use.

The user cycles through the options for "improved visibility" lighting by clicking button 125B, and then clicking button 125A as many times as needed to set up the lights the user desires. After the user presses button 125B, there is a two second period during which they can press button 125A to set up the lights as desired. Visibility is greatly improved by wearing a reflective vest.

The lighting options selected by a user persist until the user powers device 120 completely off. Once the user "programs" the lights 170, 175, 180, these remain as set.

The "improved visibility" lights 160A, 160B, 160C, 160D, 165A, 165B are also available to the user if "STOP" sign 135 or "GO" sign 140 is not being displayed. In this case they are useful for making both the footing and oneself more visible while walking around in the area where the user is directing traffic. For example, if the user needs to step over an island in the dark and needs to see for safer footing, if ground lights 165A, 165B are set to display, the user need only pull trigger 130, and ground lights 165A, 165B are lit until trigger 130 is released.

Figure 25:
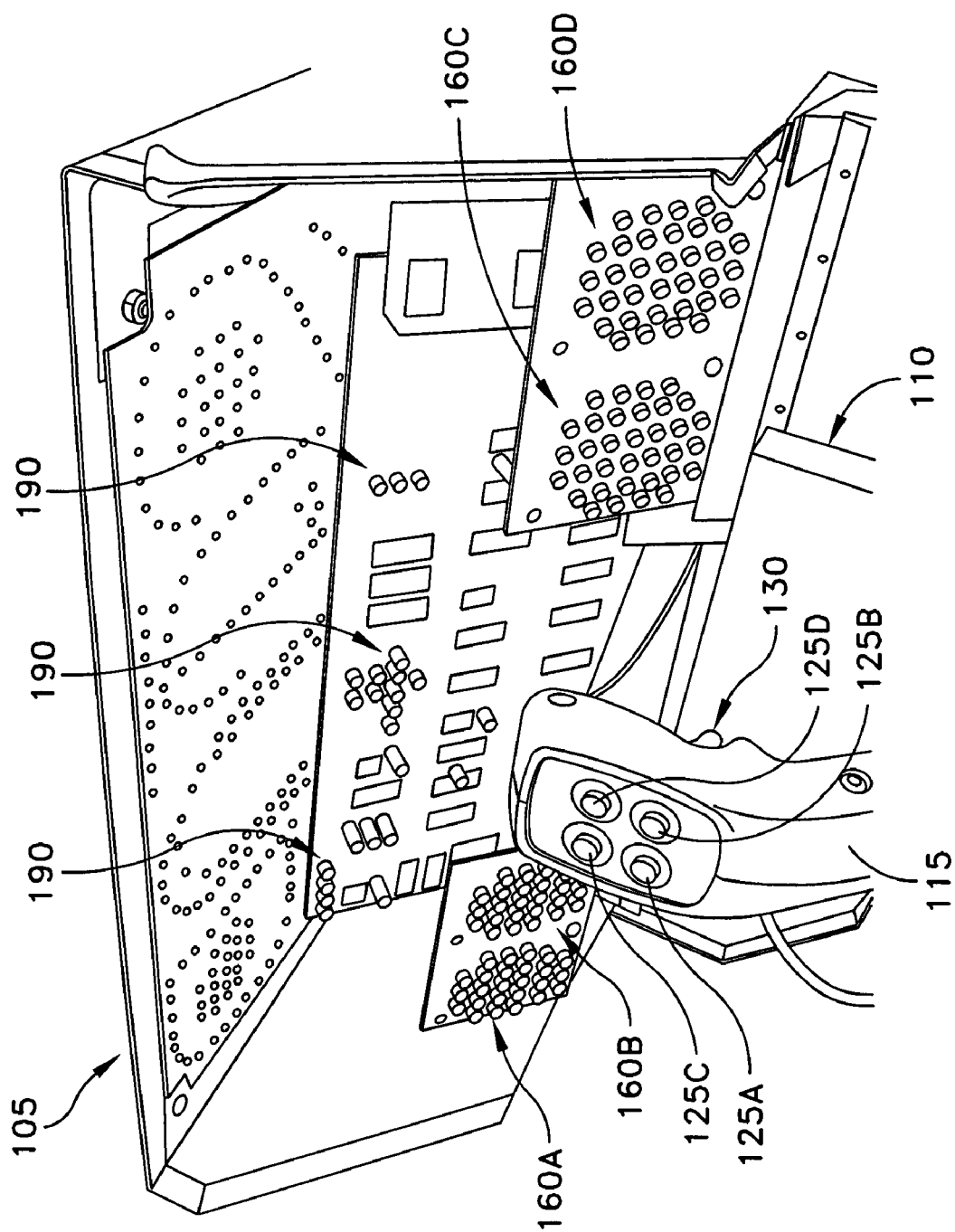

Referring to FIG. 25, there is shown a top view of two pairs of clusters of white LEDs 160A, 160B, 160C, 160D for illuminating the user. One pair 160A, 160B for a right-handed user, the other pair 160C, 160D for a left-handed user.

A control board 185 is shown behind sign 120 and in front of clusters of white LEDs 160A, 160B, 160C, 160D. Control board 185 contains all of the digital control logic and the analog regulation and switching circuitry. Control board 185 contains indicator LEDs 190 that show the user, standing behind sign 120 every active mode being displayed on the front of the device during usage.

At the right end of the control board 185 are voltage regulators specific to the SLA 12 Volt model. In the preferred embodiment having NiMH batteries, no regulators are required. The design for power distribution is similar to that in sign 5 described herein above, including a switch-selectable form of the redundant power feature.

Figure 26:
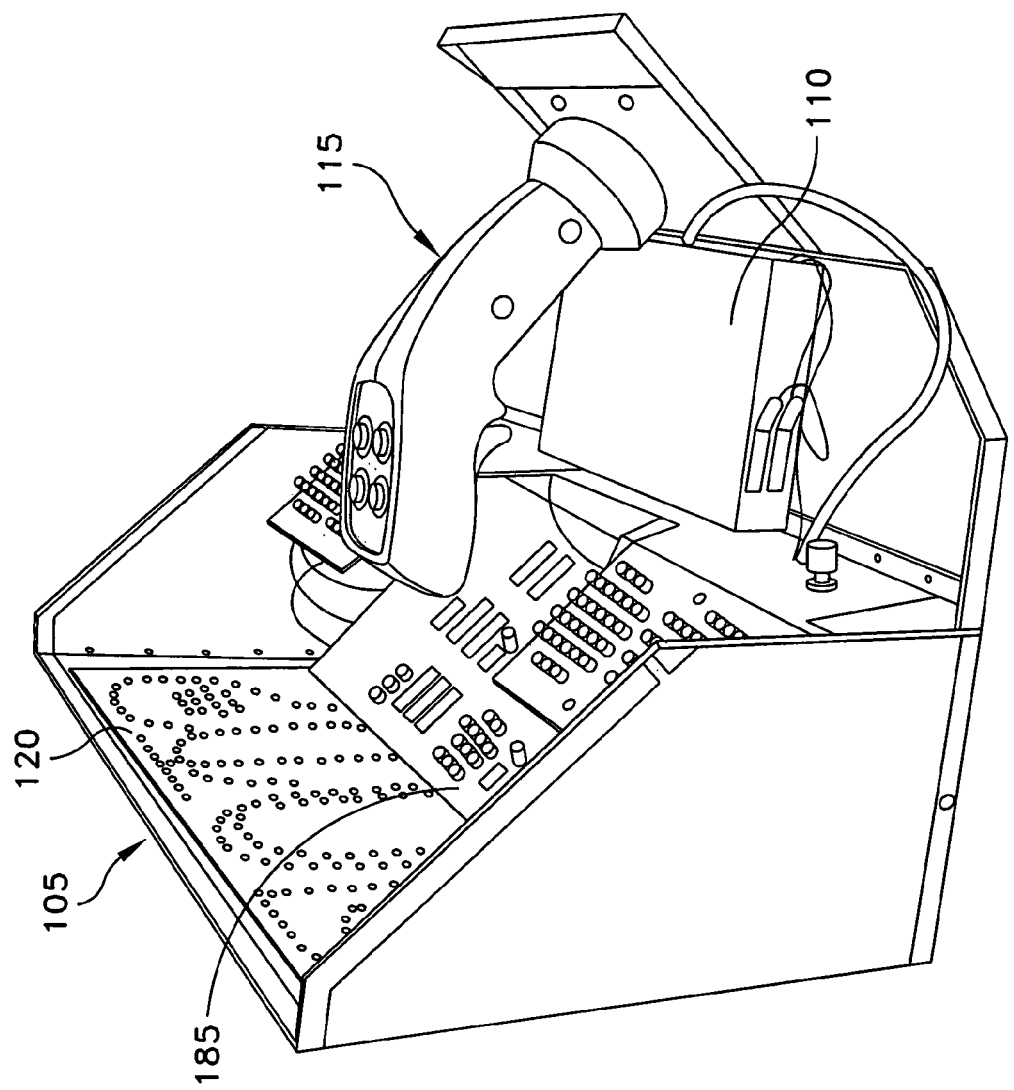

Referring to FIG. 26, there is shown a side view of device 105.

Referring again to FIG. 19, there is shown a bottom view of white LED arrays 165A, 165B for elective ground illumination.

Figure 27A:
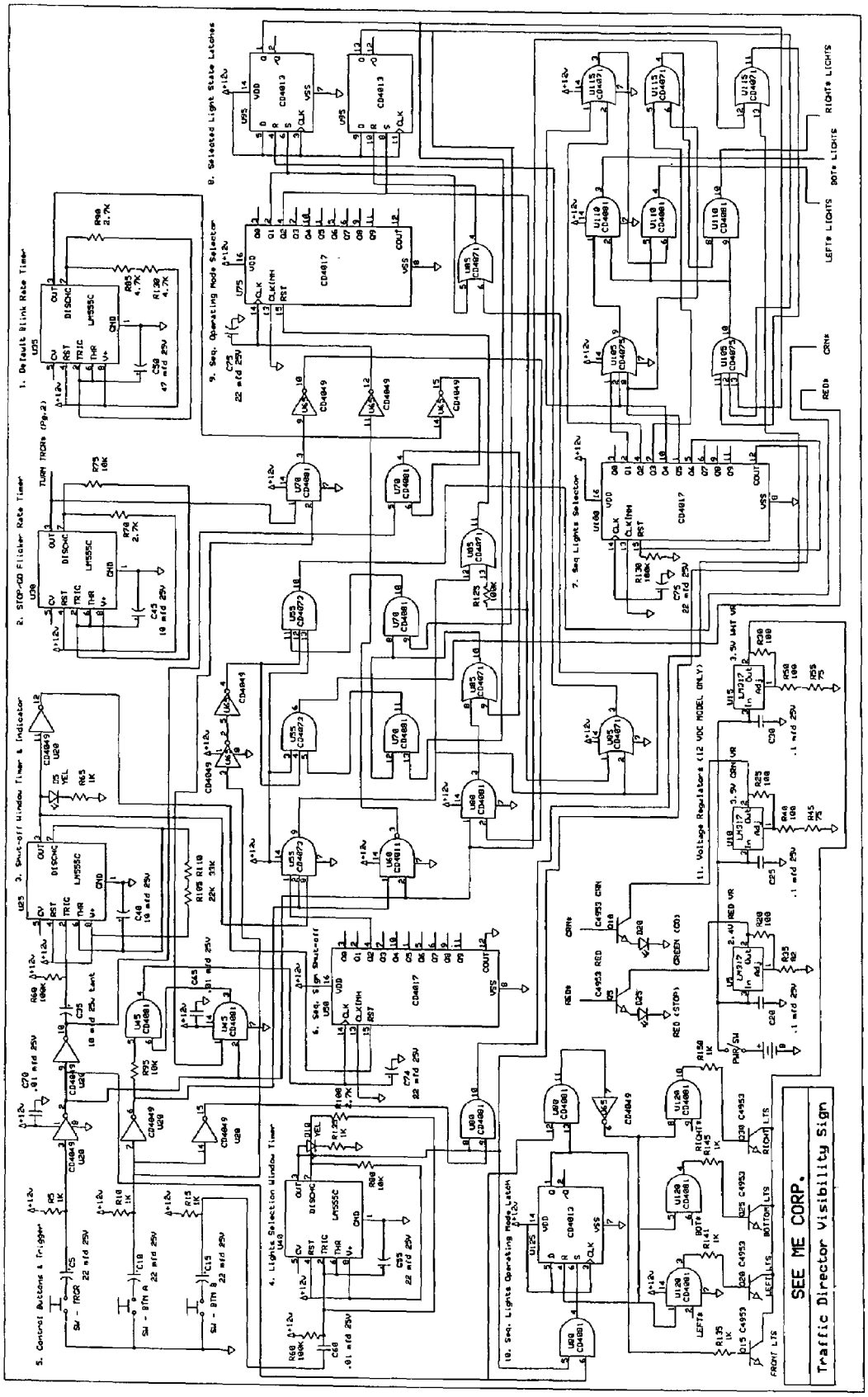

Referring now to FIGS. 27A and 27B, there are shown two schematics identified as "Traffic Director Visibility Sign" and "Traffic Director Turn Indicator".

The control circuit for display board is discussed herein below as the numbered/titled function blocks of the schematics:

1. Default Blink Rate Timer
2. STOP/GO Flicker Rate Timer
3. Shut-off Window Timer & Indicator
4. Lights Selection Window Timer
5. Control Buttons & Trigger
6. Seq. Sign Shut-off
7. Seq. Light (Side) Selector
8. Selected Light Latches
9. Seq. Lights Selector
10. Seq. Lights Latch
11. Voltage Regulators (12 VDC model only)
12. Seq. Direction Arrow Flasher Counter
13. Left/Right Direction Switches
14. Four Turn Direction Indicators 1. Default Blink Rate Timer—This LM555C oscillates at a frequency of 2 Hz. This signal is propagated through the control circuit board and and-ed with other states to enable the "STOP" and "GO" signs 135, 140 to blink at this frequency when sign 120 is set to "STOP" sign 135 or "GO" sign 140, and the user is simply holding device 105 without pressing trigger 130 or any of the buttons 125A, 125B, 125C, 125D. For example, this is the case when the user has set sign 120 to "STOP" sign 135, and sign 120 is being pointed at a specific lane or lanes of traffic that is either stopping, or has stopped.

2. STOP/GO Flicker Rate Timer—This LM555C oscillates at a frequency of 5 Hz. This signal is propagated to the portion of control board 185 that blinks "STOP" and "GO" signs 135, 140 at the default blink rate of 2 Hz. This is or-ed with the default blink rate, only when "STOP" or "GO" signs 135, 140 is switched on, and trigger 130 is pulled for a duration of one second or longer. For example, when "STOP" sign 135 is blinking at the default rate and the user wishes to boost the visibility of sign 120 to a driver who might be distracted, simply pulling trigger 130 for one second or longer will cause sign 120 to blink at this faster rate for a period of one full second, after which both clock signals are or-ed with a steady state that causes sign 120 to stay on continuously immediately after it has fast blinked for one full second. The faster blink and the steady ON display are intended to visually grab the attention of a driver who is showing signs of being inattentive or distracted.

3. Shut-off Window Timer & Indicator—This LM555C output goes high for a period of one second each time trigger 130 is clicked. While this level is high, if the hand grip button 125A is pressed while trigger 130 is clicked once, sign 120 will either turn on to display "STOP" sign 135, or it will switch states between "STOP" and "GO" signs 135, 140 or vice versa, depending upon the current display state of sign 120. For example, if "STOP" and "GO" signs 135, 140 are off (not being displayed) and button 125A is pressed and held while trigger 130 is clicked once, sign 120 will switch on to display "STOP". If sign 120 is displaying "STOP" sign 135, it will reset to display "GO" sign 140. If button 125A is pressed and held while trigger 130 is clicked twice within one second, then sign 120 displaying "STOP" sign 135 or "GO" sign 140 is turned off.

4. Lights Selection Window Timer—This LM555C oscillates at a frequency of 0.5 Hz. This level provides a 2 second window during which the user can set the persistent state of the three "Improved Visibility" lights. When the user presses button 125B, there are two seconds during which button 125A can be pressed to program, or set, the "Improved Visibility" lights. After pressing button 125B, and during the two second window, the user can press button 125A one or more times to cycle through all of the combinations of on/off settings for the "Improved Visibility" lights, until the user has turned on the desired combination. The state of the "Improved Visibility" lights persists so long as the traffic director sign 120 is powered ON. Button 125B also opens the two-second window for turning on the front white lights 155A, 155B, 155C, 155D in sign 120 for use as a bright white work light or flashlight. If button 125B is pressed, and trigger 130 is pulled and held, front white lights 155A, 155B, 155C, 155D are turned on and stay on until trigger 130 is released.

5. Control Buttons & Trigger—All control buttons 125A, 125B, 125C, 125D, and trigger 130 are debounced where required for clean signal levels.

6. Seq. Sign Shut-off—When the user presses and holds button 125A, and clicks trigger 130 twice, this counter delivers a level that shuts off "STOP" sign 135 or "Go" sign 140. Button 125A and the second click are and-ed to shut off sign 120. This interlock protects the user from inadvertently disabling sign 120 when to do so would create a dangerous situation.

7. Seq. Lights Selector—When the user presses button 125B, the two-second timer is activated. During that two second window, if button 125A is pressed, this counter outputs levels that incrementally cycle through all settings of the state of left or right "improved visibility" lights 160A, 160B, 160C, 160D, and bottom "improved visibility" lights 165A, 165B. Lights 160A, 160B, 160C, 160D, 165A, 165B are activated any time the trigger is pulled or any time the "STOP" sign 135 or "GO" sign 140 is activated. During these periods, the user is using the selected lights to improve their visibility to oncoming drivers, or to improve their footing in darkness.

8. Selected Lights State Latches—These CD4013 latches persist the user's selection of he "improved visibility" options, until the user powers the Traffic Director "off". Both modes of "STOP" and "GO" signs 135, 140 displayed, or trigger 130 pulled for visibility lights, are latched so that the selected lights are powered on so long as either state persists.

9. Seq. Operating Mode Selector—The "improved visibility" lights can be powered on in either of two states (1) when trigger 130 is pulled or (2) when the "STOP" or "GO" signs 135, 140 are displayed. Each state sets a latch that persists until some combination of either state expires.

10. Seq. Lights Operating Mode Latch—This latch level is and-ed with the selected "improved visibility" options that have been user selected. So long as the device is operating in either mode that calls for the lights, they are illuminated.

11. Voltage Regulators (12 VDC model only)—These regulators provide differing voltage levels to different colored LEDs that require specific voltages. All logic devices are powered at the level of the battery installed. The NiMH version uses the batteries installed in different combinations that provide for each of the required voltages without the need for regulators or associated energy loss through heat.

12. Seq. Direction Arrow Flasher Counte—Driven by the same timer that sets the default sign blink rate, this counter strobes turn direction arrows 145A, 145B, 145C, 145D or turn direction arrows 150A, 150B, 150C, 150D as selected by the user by pressing buttons 125D or 125C, respectively.

13. Left/Right Direction Switches—Switch levels are and-ed with the counter outputs to control the direction of the turn signals strobe (scan) effect to display left to right or right to left.

14. Four Turn Direction Indicators—These indicators 190 relay to the user the display activity that is occurring on the front of the sign display 120. There are also indicators 190 as to the state of "STOP" sign 135, "GO" sign 140, both of the trigger window timers, and the selections of the "improved visibility" lights 160A, 160B, 160C, 160D, 165A, 165B.

Beneficial Embodiments

Currently, there are at least the following preferred embodiments of the present invention for safety alert sign 5:

1. One preferred embodiment of the present invention includes a lightweight, wearable warning of the most general-purpose nature which displays text message 10, such as "SEE ME", and can be worn by cyclists, runners, walkers, members of road work crews, or others. Please note that safety alert sign 5 can indicate another text message 10, such as "BIKE COURIER", "COURIER", "CYCLIST", "RUNNER", "WALKER", etc. The purpose of text message 10, such as "SEE ME", is to provide a warning that, over time, will in turn become most widely known and reacted to most quickly. The "SEE ME" version of text message 10 provides direct benefits to a child who walks home from school after dark in the winter, a wheelchair user who crosses busy intersections, or a seeing-eye dog that is the first to step out into traffic. Typically, sign 5 uses yellow LEDs 15 for text message 10, with built-in white LEDs 40 for work lights 25.)

2. Another preferred embodiment of the present invention includes a handheld device that displays trigger selectable "STOP" and "GO" signs providing a safer, more visible tool for safety officers. Presently, safety officers direct traffic in busy intersections with their hands or with a poorly visible flashlight. Such traffic directing often occurs during rush hours, around office building or factory shift changes, and in conjunction with day or nighttime sporting events. This embodiment preferably includes scanning arrows that can indicate to drivers when their lane is permitted to turn in a selected direction. Typically, this embodiment uses red and green LEDs, with built-in white LED lights.

3. Another preferred embodiment of the present invention is a variant of the preferred embodiment described in Item 2 above, and includes bright white LEDs that illuminate both the ground beneath the safety officer, and the front side of the officer, so as to allow foot placement by sight and improve visibility at night. Safety alert sign 5 also preferably includes an array of bright, forward-illuminating white LEDs, to replace the need for a separate flashlight. Typically, this embodiment uses red, green and white LEDs, with built-in white lights.)

4. Another preferred embodiment of the present invention is a variant of Item 2 above, and includes bright white LEDs that illuminate both the ground beneath the officer for footing and the front side of the officer's body so as to improve visibility at night. This device is preferably held and operated by a grip-type control handle with a multi-button and trigger configuration. Preferably, this device provides multiple, trigger selectable "STOP" and "GO" signs on three sides so as to manage traffic flow in a busy street intersection. Typically, this preferred embodiment uses red, green, white and yellow LEDs.

5. Another preferred embodiment of the present invention provides a handheld device that displays selectable "STOP" and "SLOW" signs. This device provides a safer, more visible tool for flagmen to direct traffic at road construction sites than a simple sign that is often dirty. The handheld device of the present invention improves readability, and is turned toward and away from drivers, sending the intended message to oncoming drivers. Typically, this preferred embodiment uses red and yellow LEDs.

6. Another preferred embodiment of the present invention provides a handheld device that displays selectable "STOP" and "GO" signs providing a safer, more visible tool than a hand-held sign of the type frequently used by a crossing guard at school crossings. Typically, this preferred embodiment uses red and green LEDs.

7. Another preferred embodiment of the present invention provides a lightweight, wearable vest sign. Preferably, the vest sign identifies on both the front and rear sides the specific nature of the individual, such as "POLICE", "OFFICER", or "AGENT". As such, the wearable vest sign identifies a public servant engaged in hazardous settings, such as an accident investigation, or a roadblock. Typically, this preferred embodiment uses blue LEDs.

8. Another preferred embodiment of the present invention provides a single purpose device to selectively display "TOWED VEHICLE" with a "STOP" sign and directional arrows. This device is intended for temporary installation in the rear window of towed vehicles or trailers, now so plentiful on the highways. This device also has direct, drop-in applicability for all tow truck operators. Typically, this preferred embodiment uses yellow and red LEDs.

9. Another preferred embodiment of the present invention provides highway emergency signs, such as "BREAKDOWN", that can be attached to the rear side or window of a disabled vehicle or tow truck, and plugged into the cigarette lighter of either vehicle. This device provides a highly visible warning of a dangerous condition such as a car or service truck parked in a breakdown lane. Typically, this preferred embodiment uses yellow LEDs.

10. Another preferred embodiment of the present invention provides highway warning signs such as "WIDE LOAD" or "OVERSIZE LOAD" to replace cloth signs, often dirty or weathered to the extent that they are no longer readable. This device is preferably powered from a cigarette lighter, or from a common towing jack in parallel with the towed trailer's taillight circuit. Typically, this preferred embodiment uses yellow LEDs.

11. Another preferred embodiment of the present invention provides delivery truck courtesy signs, such as "MAKING DELIVERY. PLEASE PASS". This device alerts drivers in a stalled lane of traffic to move on around the vehicle displaying the sign. This device is preferably powered from a cigarette lighter or a simple jack in parallel with the truck's taillight circuit. Typically, this preferred embodiment uses yellow LEDs.

Any device that requires a specific language translation (i.e., not a brand name-recognition, English-language sign such as "SEE ME") is custom manufactured using a control/display board showing text for the corresponding purpose in the target language.

In most applications, the color yellow is used for two primary reasons. Yellow is the internationally recognized color for a warning. Red is a color that has been shown to occasionally trigger seizures in persons with rare, photosensitive epilepsy, particularly when the flash rate is between 3 and 55 Hertz. The flash rate is preferably kept below 3 Hertz for each of the safety alert signs, except when a Traffic Director user presses the trigger to display the one-second flicker effect to alert an apparently inattentive driver.

ADVANTAGES OF THE PRESENT INVENTION (1) Safety alert sign 5 provides a high-visibility, personal, textual, electronic, safety alert sign.

(2) Safety alert sign 5 is illuminated by super-bright LEDs that provide clear, high visibility at significant distances, under a wide range of daylight and nighttime viewing or weather conditions.

(3) Safety alert sign 5 is sized so as to be flexibly configured for use as a worn, attached, hand-held, or self-standing device.

(4) Safety alert sign 5 is designed with the general purpose of offering a platform for numerous specific warning applications to the population of individuals sharing the roadside with oncoming vehicles, either by choice or by chance.

(5) Safety alert sign 5 has a unique and immediate advantage for end users who currently face substantial risks by sharing of the roadside with vehicles operated by distracted drivers.

(6) Safety alert sign 5 transcends the ambiguity of a simple blinking light and provides the attention-getting, cognitive advantage of sending the message that, "There is a person attached to this."Through the use of concrete language and prior association with the image it evokes, the safety alert sign 5 is expected to become widely recognized as an immediate warning that caution is required, because a person lies ahead.

(7) Safety alert sign 5 affords users the research-demonstrated advantage of a textual warning that can reduce driver time to recognition, understanding, and appropriate reaction.

(8) In a multi-word message, safety alert sign 5 uniquely employs a sequential display of words, following the (in this case) English language convention for text, to emphasize the message the words convey, followed by a reinforcing flash of the full message.

(9) Display board 10 is design configurable as to text sizing depending upon the intended purpose of the warning, and the viewing distances under consideration.

(10) Computer-Aided-Design of specific display board applications enables direct translation from layout to high-volume automated board manufacturing.

(11) Safety alert sign 5 is designed with full awareness of the color and blink-rate implications of use or viewing by individuals suffering from photo-sensitive epilepsy.

(12) Safety alert sign 5 takes advantage of new and durable high energy storage density NiMH battery technology that provides optimal ease-of-charging, speed of charging, reliability and a highly beneficial time of use-to-battery weight ratio. This while enabling use of retail replacement batteries that best meet the user's cost and endurance objectives.

(13) The power consumption rate of safety alert sign 5 enables deployment for intermittent use for up to a week or longer, with a weekend, or occasional recharge. Or, for more constant use, the power consumption rate of safety alert sign 5 enables deployment typically with a recharge every day, or as long as every few days.

(14) Safety alert sign 5 incorporates a "redundant energy design" that enables extended use in any mode by simple battery swapping, instead of a one-shot, all or nothing, good battery/dead battery implementation.

(15) Safety alert sign 5 is designed for operation under road or weather conditions requiring a weatherproof device.

(16) Police officers on street details have safety problems with visibility and corresponding safety and certain applications of safety alert sign 5 mitigate some of that risk better than other existing devices.

(17) Still other advantages will be apparent to those skilled in the art.

What is claimed is:

1. A safety alert sign for providing a visible warning, the safety alert sign comprising:

a display board having a first set of LEDs supported thereon and a second set of LEDs supported thereon, wherein the first set of LEDs are disposed on the display board in a first given pattern, the second set of LEDs are disposed on the display board in a second given pattern, the first given pattern forms a textual message, and the second given pattern forms a floodlight for illuminating an area;

a control system in electrical connection with the first set of LEDs and the second set of LEDs, an actuator in electrical connection with the control system for selectively operating the first set of LEDs and the second set of LEDs; and a first voltage source and a second voltage source, the first voltage source in electrical connection with the first set of LEDs and the second voltage source in electrical connection with the control system and the second set of LEDs;

wherein the first set of LEDs operates within a first given voltage range, the control system and the second set of LEDs operate within a second given voltage range, and the first given voltage range and the second given voltage range are different voltages from one another, and further wherein the first voltage range has a first given lower limit, the second given voltage range has a second given lower limit, and the second given lower limit is less than the first given lower limit;

and further wherein the first voltage source and the second voltage source are selectively interchangeable with one another;

whereby, when the safety alert sign has been operated for some period of time so that the first voltage source is no longer able to adequately power the first set of LEDs, the second voltage source may be interchanged with the first voltage source, thereby providing a power reserve that multiplies the usable life of the safety alert sign.

2. A safety alert sign according to claim 1 wherein the textual message formed by the first set of LEDs is a single word.

3. A safety alert sign according to claim 1 wherein the textual message formed by the first set of LEDs is at least two words.

4. A safety alert sign according to claim 3 wherein the first of said at least two words is displayed first, then a second of said at least two words is displayed next, and thereafter all of said at least two words are displayed, whereby to reinforce a cognitive reading of the textual message.

5. A safety alert sign according to claim 3 wherein the textual message formed by the first set of LEDs is SEE ME.

6. A safety alert sign according to claim 1 wherein the control system is selectively configured to display the textual message in a blinking format.

7. A safety alert sign according to claim 6 wherein the control system is selectively configurable to display at least two portions of the textual message in sequentially blinking format.

8. A safety alert sign according to claim 1 wherein the control system is selectively configurable to display the textual message in a non-blinking format.

9. A safety alert sign according to claim 1 wherein the first set of LEDs are a first given color, and the second set of LEDs are a second given color.

10. A safety alert sign according to claim 9 wherein the first given color is yellow.

11. A safety alert sign according to claim 9 wherein the second given color is white.

12. A safety alert sign according to claim 1 wherein the first voltage source comprises a first rechargeable battery and the second voltage source comprises a second rechargeable battery, and further wherein the first rechargeable battery and the second rechargeable battery are selectively interchangeable with one another.

13. A safety alert sign according to claim 1 wherein the display board, control system, first voltage source, and second voltage source are sized to be worn by a human.

14. A safety alert sign according to claim 1 further comprising a waterproof pouch, wherein the display board, control system, first voltage source, and second voltage source are disposed on the waterproof pouch.

15. A safety alert sign according to claim 1 wherein the second given voltage range is about 3 volts to 7 volts.

16. A safety alert sign according to claim 1 wherein the first set of LEDs operate within a third voltage range, the second set of LEDs operate within a fourth voltage range, and the third voltage range and the fourth voltage range are different from one another.

17. A safety alert sign according to claim 1 wherein the first set of LEDs comprise yellow LEDs, the second set of LEDs comprise white LEDs, and the white LEDs operate at a higher voltage with a lesser current requirement than the yellow LEDs.

18. A hand-held device for directing traffic, the hand-held device comprising:
   a display board having a front side and a back side, a left side and right side, a topside and a bottom side, a first set of LEDs supported on the display board and a second set of LEDs supported on the display board, the first set of LEDs and the second set of LEDs disposed for viewing from the front side of the display board, wherein the first set of LEDs are disposed on the display board in a first given pattern, the second set of LEDs are disposed on the display board in a second given pattern, the first given pattern forms a message to stop traffic, and the second given pattern forms a message to advance traffic;
   a control system in electrical connection with the first set of LEDs and the second set of LEDs, and the control system in attachment to the display board;
   a control handle in attachment with the display board, and the control handle in electrical connection with the control system; and
   a voltage source in electrical connection with the first set of LEDs, the second set of LEDs, and the control system.

19. A handle-held device according to claim 18 wherein the first given pattern formed by the first set of LEDs comprises a first textual message.

20. A handle-held device according to claim 19 wherein the first textual message comprises STOP.

21. A hand-held device according to claim 20 wherein the first set of LEDs comprises red LEDs.

22. A hand-held device according to claim 18 wherein the second given pattern formed by the second set of LEDs comprises a second textual message.

23. A hand-held device according to claim 22 wherein the second textual message comprises GO.

24. A hand-held device according to claim 23 wherein the second set of LEDs comprises green LEDs.

25. A hand-held device according to claim 18 further comprising a third set of LEDs supported on the display board for viewing from the front side thereof, the third set of LEDs disposed in a third given pattern, and the third given pattern forms a first group of LEDs strobed to signal a right turn and a second group of LEDs strobed to signal a left turn.

26. A hand-held device according to claim 25 wherein the first group of LEDs comprises a first plurality of arrow-like indicators in the shape of > and configured to scan in a direction from the left side to the right side of the display board, and acting as a signal to a driver to begin a right turn.

27. A hand-held device according to claim 25 wherein the second group of LEDs comprises a second plurality of arrow-like indicators in the shape of a < and configured to scan in a direction from the right side to the left side of the display board, and acting as a signal to a driver to begin a left turn.

28. A hand-held device according to claim 25 wherein the third set of LEDs comprises green LEDs.

29. A hand-held device according to claim 18 further comprising a fourth set of LEDs supported on the display board for viewing from the front side thereof, and the fourth set of LEDs configured to form a floodlight for selective illumination in a direction from the back side to the front side of the display board.

30. A hand-held device according to claim 18 further comprising a fifth set of LEDs disposed behind and away from the back side of the display board, and the fifth set of LEDs configured to form a spotlight for selective illumination of the body of an operator holding the control handle.

31. A hand-held device according to claim 30 further comprising a sixth set of LEDs disposed behind and in a direction away from the back side of the display board, wherein the fifth set of LEDs are configured to illuminate the front side of a right-handed operator and the sixth set of LEDs are configured to illuminate the front side of a left-handed operator.

32. A hand-held device according to claim 18 further comprising a seventh set of LEDs in attachment to the control handle and disposed in a direction away from the bottom side of the display board so as to form a spotlight for selectively illuminating a ground surface adjacent to an operator.

33. A handheld device according to claim 18 further comprising an eighth set of LEDs supported on the display board for viewing from the back side thereof, and the eighth set of LEDs forming indicator lights for conveying to an operator display information communicated on the front side of the display board.

34. A hand-held device according to claim 18 wherein the control handle comprises a joystick grip having an index finger switch and a plurality of thumb operable buttons.

35. A hand-held device according to claim 18 wherein the voltage source comprises an attached battery power source.

36. A hand-held device according to claim 35 wherein the attached battery comprises one selected from a group consisting of a sealed lead-acid battery, or a nickel metal-hydride battery, in sizes ranging from "AA" to "D" cells.

37. A hand-held device according to claim 18 wherein the voltage source comprises a remotely disposed source delivered through a power cable to the first set of LEDs, the second set of LEDs, and the control system.

38. A handheld device for directing traffic, the hand-held device comprising:
a display board having a front side and a back side, a left side and right side, a topside and a bottom side, a first set of LEDs supported on the display board and a second set of LEDs supported on the display board, the first set of LEDs and the second set of LEDs disposed for viewing from the front side of the display board, wherein the first set of LEDs are disposed on the display board in a first given pattern, the second set of LEDs are disposed on the display board in a second given pattern, the first given pattern configured for forming a message to stop traffic, and the second given pattern configured for forming a message to advance traffic;
a control system in electrical connection with the first set of LEDs and the second set of LEDs, and the control system in attachment to the display board;
a control handle in attachment with the display board, and the control handle in electrical connection with the control system;
a voltage source in electrical connection with the first set of LEDs, the second set of LEDs, and the control system;
wherein the first given pattern formed by the first set of LEDs comprises a first textual message;
wherein the first textual message comprises STOP;
wherein the first set of LEDs comprises red LEDs;
wherein the second given pattern formed by the second set of LEDs comprises a second textual message;
wherein the second textual message comprises GO;
wherein the second set of LEDs comprises green LEDs;
a third set of LEDs supported on the display board for viewing from the front side thereof, the third set of LEDs disposed in a third given pattern, and the third given pattern forms a first group of LEDs to signal a right turn and a second group of LEDs to signal a left turn;
wherein the first group of LEDs comprises a first plurality of arrows configured to scan in a direction from the left side to the right side of the display board;
wherein the second group of LEDs comprises a second plurality of arrows configured to scan in a direction from the right side to the left side of the display board;
wherein the third set of LEDs comprises green LEDs;
a fourth set of LEDs supported on the display board for viewing from the front side thereof, and the fourth set of LEDs configured to form a floodlight for selective illumination in a direction from the back side to the front side of the display board;
a fifth set of LEDs disposed behind and away from the back side of the display board, and the fifth set of LEDs configured to form a spotlight for selective illumination of an operator holding the control handle;
a sixth set of LEDs disposed behind and in a direction away from the back side of the display board, wherein the fifth set of LEDs are configured to illuminate the front side of a right-handed operator and the sixth set of LEDs are configured to illuminate the front side of a left-handed operator;
a seventh set of LEDs in attachment to the control handle and disposed in a direction away from the bottom side of the display board so as to form a spotlight for selectively illuminating a ground surface adjacent to an operator;
an eighth set of LEDs supported on the display board for viewing from the back side thereof, and the eighth set of LEDs forming indicator lights for conveying to an operator display information communicated on the front side of the display board;
wherein the control handle comprises a joystick grip having an index finger switch and a plurality of thumb operable buttons;
wherein the voltage source comprises an attached battery.

39. A hand-held device according to claim 38 wherein the attached battery comprises one selected from a group consisting of a sealed lead-acid battery, or a nickel metal-hydride battery, in sizes ranging from "AA" to "D" cells.

40. A hand-held device according to claim 38 wherein the voltage source further comprises a remotely disposed source delivered through a power cable to the first set of LEDs, the second set of LEDs, and the control system.

41. A safety alert sign for providing a visible warning, the safety alert sign comprising:
a display board having a first set of LEDs supported thereon and a second set of LEDs supported thereon, wherein the first set of LEDs are disposed on the display board in a first given pattern, the second set of LEDs are disposed on the display board in a second given pattern, the first given pattern forms a textual message, and the second given pattern forms a floodlight for illuminating an area;
a control system in electrical connection with the first set of LEDs and the second set of LEDs, an actuator in electrical connection with the control system for selectively operating the first set of LEDs and the second set of LEDs; and
a first voltage source and a second voltage source, the first voltage source in electrical connection with the first set of LEDs and the second voltage source in electrical connection with the control system and the second set of LEDs;
wherein the first voltage source and the second voltage source may be interchanged so that the first voltage source is in electrical connection with the control system and the second set of LEDs, and the second voltage source is in electrical connection with the first set of LEDs.

42. A safety alert sign for providing a visible warning, the safety alert sign comprising:

a display board having LEDs supported thereon, wherein the LEDs are disposed on the display board in a given pattern, and the given pattern forms a textual message;

a control system in electrical connection with the LEDs, an actuator in electrical connection with the control system for selectively operating the LEDs; and a first voltage source and a second voltage source, the first voltage source in electrical connection with the LEDs, and the second voltage source in electrical connection with the control system;

wherein the LEDs operate within a first given voltage range, the control system operates within a second given voltage range, and the first given voltage range and the second given voltage range are different voltages from one another, and further wherein the first voltage range has a first given lower limit, the second given voltage range has a second given lower limit, and the second given lower limit is less than the first given lower limit;

and further wherein the first voltage source and the second voltage source are selectively interchangeable with one another;

whereby, when the safety alert sign has been operated for some period of time so that the first voltage source is no longer able to adequately power the LEDs, the second voltage source may be interchanged with the first voltage source, thereby providing a power reserve that multiplies the usable life of the safety alert sign.

43. A hand-held device for directing traffic, the handheld device comprising:

a display board having a front side and a back side, a left side and right side, a topside and a bottom side, a first set of LEDs supported on the display board and a second set of LEDs supported on the display board, the first set of LEDs and the second set of LEDs disposed for viewing from the front side of the display board, wherein the first set of LEDs are disposed on the display board in a first given pattern, the second set of LEDs are disposed on the display board in a second given pattern, the first given pattern forms a message to stop traffic, and the second given pattern forms a message to advance traffic;

a control system in electrical connection with the first set of LEDs and the second set of LEDs, and the control system in attachment to the display board;

a control handle in attachment with the display board, and the control handle in electrical connection with the control system; and a voltage source in electrical connection with the first set of LEDs, the second set of LEDs, and the control system;

wherein the control handle comprises a joystick grip having an index finger switch and a plurality of thumb operable buttons.

44. A method of using a safety alert sign comprising:

providing a safety alert sign for providing a visible warning, the safety alert sign comprising:

a display board having a first set of LEDs supported thereon and a second set of LEDs supported thereon, wherein the first set of LEDs are disposed on the display board in a first given pattern, the second set of LEDs are disposed on the display board in a second given pattern, the first given pattern forms a textual message, and the second given pattern forms a floodlight for illuminating an area;

a control system in electrical connection with the first set of LEDs and the second set of LEDs, an actuator in electrical connection with the control system for selectively operating the first set of LEDs and the second set of LEDs; and a first voltage source and a second voltage source, the first voltage source in electrical connection with the first set of LEDs and the second voltage source in electrical connection with the control system and the second set of LEDs;

wherein the first set of LEDs operates within a first given voltage range, the control system and the second set of LEDs operate within a second given voltage range, and the first given voltage range and the second given voltage range are different voltages from one another, and further wherein the first voltage range has a first given lower limit, the second given voltage range has a second given lower limit, and the second given lower limit is less than the first given lower limit;

and further wherein the first voltage source and the second voltage source are selectively interchangeable with one another; and interchanging the second voltage source with the first voltage source when the safety alert sign has been operated for some period of time so that the first voltage source is no longer able to adequately power the first set of LEDs, thereby providing a power reserve that multiplies the usable life of the safety alert sign.

45. A method of using a safety alert sign comprising:

providing a safety alert sign for providing a visible warning, the safety alert sign comprising:

a display board having LEDs supported thereon, wherein the LEDs are disposed on the display board in a given pattern, and the given pattern forms a textual message;

a control system in electrical connection with the LEDs, an actuator in electrical connection with the control system for selectively operating the LEDs; and a first voltage source and a second voltage source, the first voltage source in electrical connection with the LEDs, and the second voltage source in electrical connection with the control system;

wherein the LEDs operate within a first given voltage range, the control system operates within a second given voltage range, and the first given voltage range and the second given voltage range are different voltages from one another, and further wherein the first voltage range has a first given lower limit, the second given voltage range has a second given lower limit, and the second given lower limit is less than the first given lower limit;

and further wherein the first voltage source and the second voltage source are selectively interchangeable with one another; and interchanging the second voltage source with the first voltage source when the safety alert sign has been operated for some period of time so that the first voltage source is no longer able to adequately power the LEDs, thereby providing a power reserve that multiplies the usable life of the safety alert sign.

* * * * *